US012800991B2

(12) United States Patent
Chang et al.

(10) Patent No.: US 12,800,991 B2
(45) Date of Patent: Nov. 17, 2026

(54) DYNAMIC APERTURE MODULE, IMAGING LENS ASSEMBLY MODULE AND ELECTRONIC DEVICE

(71) Applicant: LARGAN PRECISION CO., LTD., Taichung City (TW)

(72) Inventors: Yu-Tzu Chang, Taichung City (TW); Hao-Jan Chen, Taichung City (TW); Hsiu-Yi Hsiao, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 287 days.

(21) Appl. No.: 18/500,295

(22) Filed: Nov. 2, 2023

(65) Prior Publication Data

US 2024/0152032 A1 May 9, 2024

Related U.S. Application Data

(60) Provisional application No. 63/382,310, filed on Nov. 4, 2022.

(51) Int. Cl.
*G03B 9/06* (2021.01)

(52) U.S. Cl.
CPC .................................... *G03B 9/06* (2013.01)

(58) Field of Classification Search
CPC ... G03B 9/06; G03B 9/18; G03B 9/20; G03B 9/08; G03B 9/10; G03B 2217/002; H04N 23/55; G02F 1/00
See application file for complete search history.

(56) References Cited

U.S. PATENT DOCUMENTS

| | | | | |
|---|---|---|---|---|
| 10,969,653 | B2 | 4/2021 | Kim et al. | |
| 2012/0076486 | A1 | 3/2012 | Bai | |
| 2012/0076586 | A1* | 3/2012 | Varsoke | B63C 3/02 405/3 |
| 2020/0064711 | A1 | 2/2020 | Kim | |
| 2022/0007573 | A1* | 1/2022 | Kloepfer | A01D 34/733 |

(Continued)

FOREIGN PATENT DOCUMENTS

| | | | |
|---|---|---|---|
| CN | 113259545 | A | 8/2021 |
| CN | 215867468 | U | 2/2022 |
| CN | 114285242 | B | 8/2022 |

(Continued)

*Primary Examiner* — Brandi N Thomas
(74) *Attorney, Agent, or Firm* — McClure, Qualey & Rodack, LLP

(57) ABSTRACT

A dynamic aperture module includes a blade set and a driving portion. The blade set includes a plurality of blades, which are disposed around an optical axis to form a light through hole and rotatable for adjusting the light through hole. The driving portion includes a rotating element, at least one magnet and at least one coil. The rotating element corresponds to the blades and is configured to drive the blades to rotate, so that a dimension of the light through hole is variable. The magnet includes four polarities. The polarities of the magnet are relatively distributed along a direction surrounding the optical axis and a direction parallel to the optical axis, respectively. The coil corresponds to the magnet, and one of the magnet and the coil is disposed on the rotating element. The magnet and the coil are disposed along the direction parallel to the optical axis.

33 Claims, 29 Drawing Sheets

(56) References Cited

U.S. PATENT DOCUMENTS

2022/0382128 A1 12/2022 Lee

FOREIGN PATENT DOCUMENTS

| | | | |
|---|---|---|---|
| DE | 102012111731 | B4 | 10/2017 |
| KR | 20180105970 | A | 10/2018 |
| TW | I633381 | B | 8/2018 |
| WO | 2020124553 | A1 | 6/2020 |
| WO | 2022052039 | A1 | 3/2022 |

* cited by examiner

41

40

DYNAMIC APERTURE MODULE, IMAGING LENS ASSEMBLY MODULE AND ELECTRONIC DEVICE

RELATED APPLICATIONS

This application claims priority to U.S. Provisional Application Ser. No. 63/382,310, filed Nov. 4, 2022, which is herein incorporated by reference.

BACKGROUND

Technical Field

The present disclosure relates to a dynamic aperture module and an imaging lens assembly. More particularly, the present disclosure relates to a dynamic aperture module and an imaging lens assembly applicable to portable electronic devices.

Description of Related Art

In recent years, portable electronic devices have developed rapidly. For example, intelligent electronic devices and tablets have been filled in the lives of modern people, and camera modules and imaging lens assembly modules mounted on portable electronic devices have also prospered. However, as technology advances, the quality requirements of the dynamic aperture module are becoming higher and higher. Therefore, a dynamic aperture module, which can control the dimension of the light through hole, needs to be developed.

SUMMARY

According to one aspect of the present disclosure, a dynamic aperture module includes a blade set and a driving portion. The blade set includes a plurality of blades. The blades are disposed around an optical axis to form a light through hole and rotatable for adjusting the light through hole. The driving portion includes a rotating element, at least one magnet and at least one coil. The rotating element corresponds to the blades and is configured to drive the blades to rotate, so that a dimension of the light through hole is variable. The at least one magnet includes four polarities, the polarities of the at least one magnet are relatively distributed along a direction surrounding the optical axis and a direction parallel to the optical axis, respectively. The at least one coil corresponds to the at least one magnet, and one of the at least one magnet and the at least one coil is disposed on the rotating element. The at least one magnet and the at least one coil are disposed along the direction parallel to the optical axis.

According to one aspect of the present disclosure, an imaging lens assembly module includes the dynamic aperture module of the aforementioned aspect and an imaging lens assembly. The dynamic aperture module and the imaging lens assembly are arranged in order from an object side to an image side along the optical axis, and a light enters the imaging lens assembly via the light through hole.

According to one aspect of the present disclosure, an electronic device includes the imaging lens assembly module of the aforementioned aspect.

According to one aspect of the present disclosure, a dynamic aperture module includes a blade set and a driving portion. The blade set includes a plurality of blades. The blades are disposed around an optical axis to form a light through hole and rotatable for adjusting the light through hole. The driving portion includes a frame element, a rotating element, at least one magnet, at least one coil and at least two bearing members. The rotating element rotates relatively to the frame element, corresponds to the blades, and is configured to drive the blades to rotate relatively to the frame element, so that a dimension of the light through hole is variable. The at least one coil corresponds to the at least one magnet, and one of the at least one magnet and the at least one coil is disposed on the rotating element. The at least two bearing members disposed between the frame element and the rotating element along a direction parallel to the optical axis.

According to one aspect of the present disclosure, an imaging lens assembly module includes the dynamic aperture module of the aforementioned aspect and an imaging lens assembly. The dynamic aperture module and the imaging lens assembly are arranged in order from an object side to an image side along the optical axis, and a light enters the imaging lens assembly via the light through hole.

According to one aspect of the present disclosure, an electronic device includes the imaging lens assembly module of the aforementioned aspect.

According to one aspect of the present disclosure, a dynamic aperture module includes a blade set, a driving portion and a stable hole element. The blade set includes a plurality of blades. The blades are disposed around an optical axis to form a light through hole and rotatable for adjusting the light through hole. The driving portion includes a rotating element, at least one magnet and at least one coil. The rotating element corresponds to the blades and is configured to drive the blades to rotate, so that a dimension of the light through hole is variable. The at least one coil corresponds to the at least one magnet, and one of the at least one magnet and the at least one coil is disposed on the rotating element. The stable hole element has a stable hole. The stable hole element corresponds to the blade set, the stable hole element is adjacent to the blade set and is coaxial with the blade set.

According to one aspect of the present disclosure, an imaging lens assembly module includes the dynamic aperture module of the aforementioned aspect and an imaging lens assembly. The dynamic aperture module and the imaging lens assembly are arranged in order from an object side to an image side along the optical axis, and a light enters the imaging lens assembly via the light through hole.

According to one aspect of the present disclosure, an electronic device includes the imaging lens assembly module of the aforementioned aspect.

DETAILED DESCRIPTION

Figure 1A:
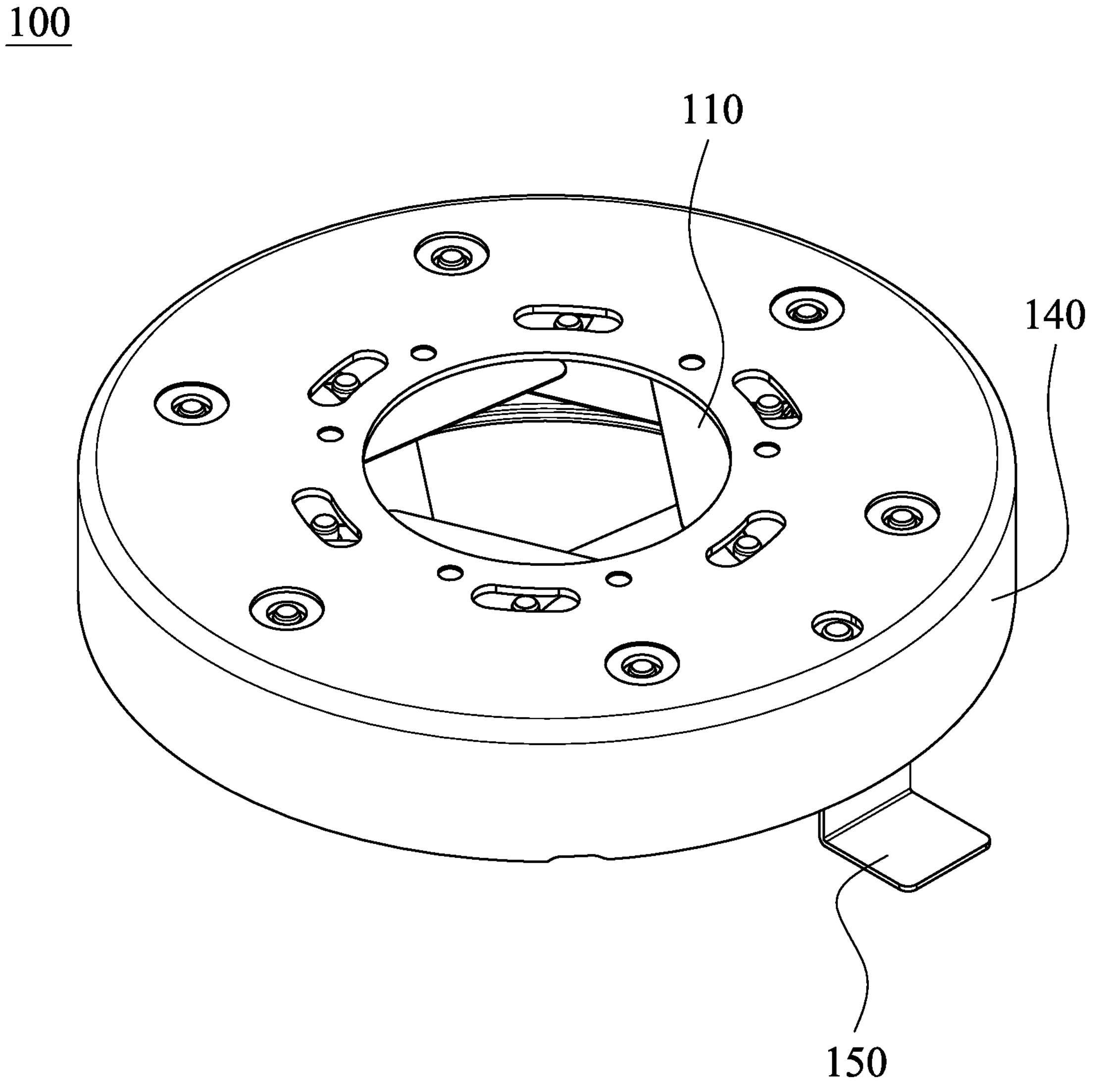
FIG. 1A is a three-dimensional schematic view of a dynamic aperture module according to the 1st embodiment of the present disclosure.

The present disclosure provides a dynamic aperture module, which includes a blade set and a driving portion. The blade set includes a plurality of blades. The blades are disposed around an optical axis to form a light through hole and rotatable for adjusting the light through hole. The driving portion includes a rotating element, at least one magnet and at least one coil. The rotating element corresponds to the blades and is configured to drive the blades to rotate, so that a dimension of the light through hole is variable. The coil corresponds to the magnet, and one of the magnet and the coil is disposed on the rotating element. In detail, the magnet and the coil drive the rotating element to rotate, and the rotating element and the blades are disposed relatively, so that the blades are rotatable to adjust the dimension of the light through hole.

The magnet can include four polarities, wherein the polarities of the magnet are relatively distributed along a direction surrounding the optical axis and a direction parallel to the optical axis, respectively. The magnet and the coil are disposed along the direction parallel to the optical axis. The polarities of the magnet can maintain the stability of the magnetic field in a high level.

The driving portion can further include a frame element. The rotating element can rotate relatively to the frame element, and is configured to drive the blades to rotate relatively to the frame element, so that a dimension of the light through hole is variable. The frame element is disposed on the rotating element along the direction parallel to the optical axis. Thus, the rotating element has the sufficient supporting characteristic to support the frame element so as to keep the structural strength thereof and achieve the condition of the mass production. In particular, the magnet and the coil are configured to drive the rotating element to rotate relatively to the frame element, and the rotating element is corresponded to the blades, so the blades are rotatable to adjust the dimension of the light through hole.

The driving portion can further include at least two bearing members, wherein the bearing members are disposed between the frame element and the rotating element along the direction parallel to the optical axis, and it is favorable for the rotating element to rotate. Moreover, each of the bearing members can be a ball element, but the present disclosure is not limited thereto. The bearing members are aligned to the optical axis, so that the rotating stability of the rotating element can be enhanced.

The dynamic aperture module can further include a stable hole element, wherein the stable hole element has a stable hole. The stable hole element corresponds to the blade set, the stable hole element is adjacent to the blade set and is coaxial with the blade set. In detail, the stable hole element is disposed along the direction parallel to the optical axis, and can be disposed above or below the blade set.

The frame element can include a magnetic element, wherein the magnetic element interacts with the magnet, and the magnetic element can be insert molded, but the present disclosure is not limited thereto. Thus, the preload force of the frame element can be increased to enhance the assembling stability. Or, the magnetic element interacts with the coil so as to maintain the stability of the magnetic field, so that the rotating element can rotate relatively to the frame element stably.

Each of the blades can include a first surface layer, a second surface layer and an inner substrate layer. The inner substrate layer is disposed between the first surface layer and the second surface layer. In particular, a composite material form is suitable for thinning manufacturing requirements, and the present disclosure is not limited thereto.

The blades surround the optical axis to form the light through hole, and the first surface layer and the second surface layer of each of the blades are closer to a center of the light through hole than the inner substrate layer to the center of the light through hole. With the interlayer structure, the reflection of the diffused light can be reduced.

The stable hole element can include a plurality of light blocking structures. The light blocking structures are adjacent to the stable hole. Therefore, the light blocking structures can block a stray light.

The dynamic aperture module can further include a light blocking element, wherein the light blocking element and the stable hole element are disposed relatively to the blade set, respectively. In detail, the light blocking element is disposed along the direction parallel to the optical axis, and can be disposed above or below the blade set, wherein one of the light blocking element and the stable hole element is disposed above the blade set, and the other one of the light blocking element and the stable hole element is disposed below the blade set.

The stable hole element can include a first surface layer, a second surface layer and an inner substrate layer. The inner substrate layer is disposed between the first surface layer and the second surface layer. In particular, a composite material form is suitable for thinning manufacturing requirements, and the present disclosure is not limited thereto.

The blades surround the optical axis to form the light through hole, and the first surface layer and the second surface layer of the stable hole element are closer to the center of the light through hole than the inner substrate layer to the center of the light through hole. With the interlayer structure, the reflection of the diffused light can be reduced.

Each of the bearing members can include four contacted points, wherein the contacted points are physically contacted with the frame element or the rotating element, and a number of the bearing member is not more than five to maintain the production yield. Moreover, the contacted points can include an inner contacted point, an outer contacted point, an upper contacted point and a lower contacted point, wherein the inner contacted point is one of the contacted points closest to the optical axis, the outer contacted point is one of the contacted points farthest away from the optical axis, the upper contacted point is one of two of the contacted points farthest away on the direction parallel to the optical axis, and the lower contacted point is the other one of the two of the contacted points farthest away on the direction parallel to the optical axis. In particular, the positioning alignment between the frame element and the rotating element can be obtained via the bearing members, so that the positioning between the elements can be maintained via the bearing members during the rotating process. Hence, the radial positioning between the frame element and the rotating element can be obtained via the inner contacted point and the outer contacted point, and the axial positioning between the frame element and the rotating element can be obtained via the upper contacted point and the lower contacted point.

When along a direction vertical to the optical axis, a distance between the inner contacted point and the outer contacted point is Dt, and a distance between the inner contacted point and the lower contacted point is Di, the following condition can be satisfied: $0.3 \leq Di/Dt \leq 0.7$. Therefore, the force balance of the rotating element and the frame element can be obtained so as to maintain the dynamic stability.

Or, each of the bearing members can include three contacted points physically contacted with the frame element or the rotating element, wherein a number of the bearing members is not more than five to maintain the production yield. In particular, the contacted points include an inner contacted point, an outer contacted point, an upper contacted point and a lower contacted point. Moreover, the inner contacted point is one of the contacted points closest to the optical axis, the outer contacted point is one of the contacted points farthest away from the optical axis, the upper contacted point is one of two of the contacted points farthest away on a direction parallel to the optical axis, and the lower contacted point is the other one of the two of the contacted points farthest away on the direction parallel to the optical axis, wherein one of the contacted points is simultaneously one of the inner contacted point and the outer contacted point and one of the upper contacted point and the lower contacted point. Hence, the radial positioning and the axial supporting between the frame element and the rotating element can be more accurate via the design of the position of the different contacted points, so that the image quality of the imaging lens assembly module can be enhanced.

When along the direction vertical to the optical axis, the distance between the inner contacted point and the outer contacted point is Dt, and a distance between a remaining one of the contacted points and the inner contacted point is Di', the following condition can be satisfied: $0.3 \leq Di'/Dt \leq 0.7$. Therefore, the force balance of the rotating element and the frame element can be obtained so as to maintain the dynamic stability.

Each of the blades can further include a nanostructure layer, wherein the nanostructure layer has a plurality of irregular protrusions, and an average height of the nanostructure layer can be between 85 nm to 255 nm. With the aforementioned range of the average height, a better anti-reflective effect can be obtained without impacting the imaging quality.

The stable hole element can include a nanostructure layer, wherein the nanostructure layer has a plurality of irregular ridge-like protrusions, and an average height of the nanostructure layer can be between 125 nm to 300 nm. With the aforementioned range of the average height, a better anti-reflective effect can be obtained without impacting the imaging quality. Further, the average height of the nanostructure layer can be between 195 nm to 255 nm. With the aforementioned range of the average height, a better anti-reflective effect can be obtained without impacting the imaging quality. Furthermore, the material of the nanostructure layer can include Aluminum Oxide ($Al_2O_3$), when the average height of the nanostructure layer approaches 200 nm, the incident light with specific condition can obtain better anti-reflective effect, but the present disclosure is not limited thereto. Moreover, the nanostructure layer has a plurality of irregular protrusions, wherein an average height of the nanostructure layer is between 85 nm to 255 nm.

Each of the aforementioned features of the dynamic aperture module can be utilized in various combinations for achieving the corresponding effects.

The present disclosure provides an imaging lens assembly module, which includes the aforementioned dynamic aperture module and an imaging lens assembly. The dynamic aperture module and the imaging lens assembly are arranged in order from an object side to an image side along the optical axis, and a light enters the imaging lens assembly via the light through hole.

The present disclosure provides an electronic device, which includes the aforementioned imaging lens assembly module.

According to the aforementioned embodiment, specific embodiments and examples are provided, and illustrated via figures.

1st Embodiment

Figure 1B:
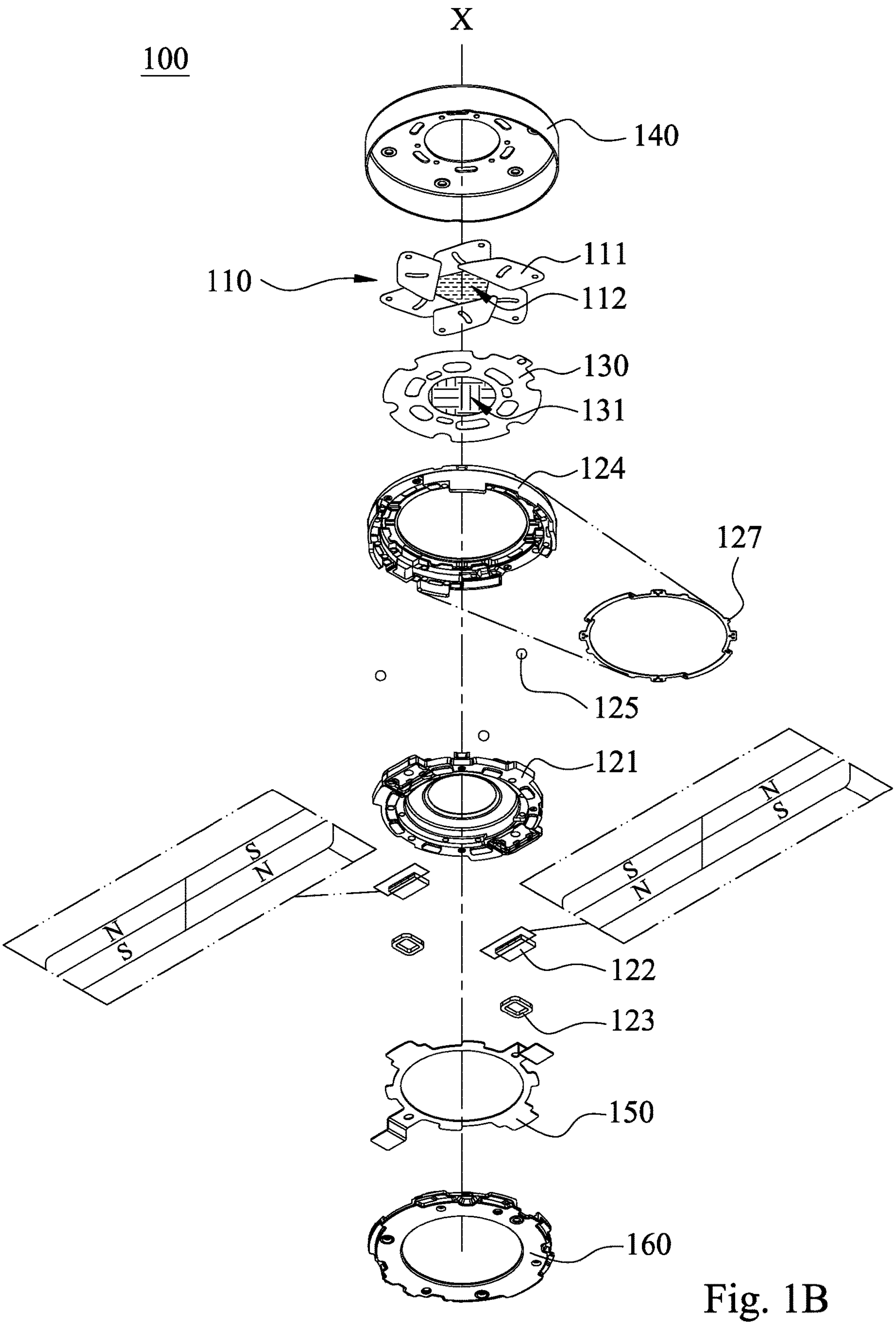
FIG. 1B is an exploded view of the dynamic aperture module according to the 1st embodiment in FIG. 1A.
Figure 1C:
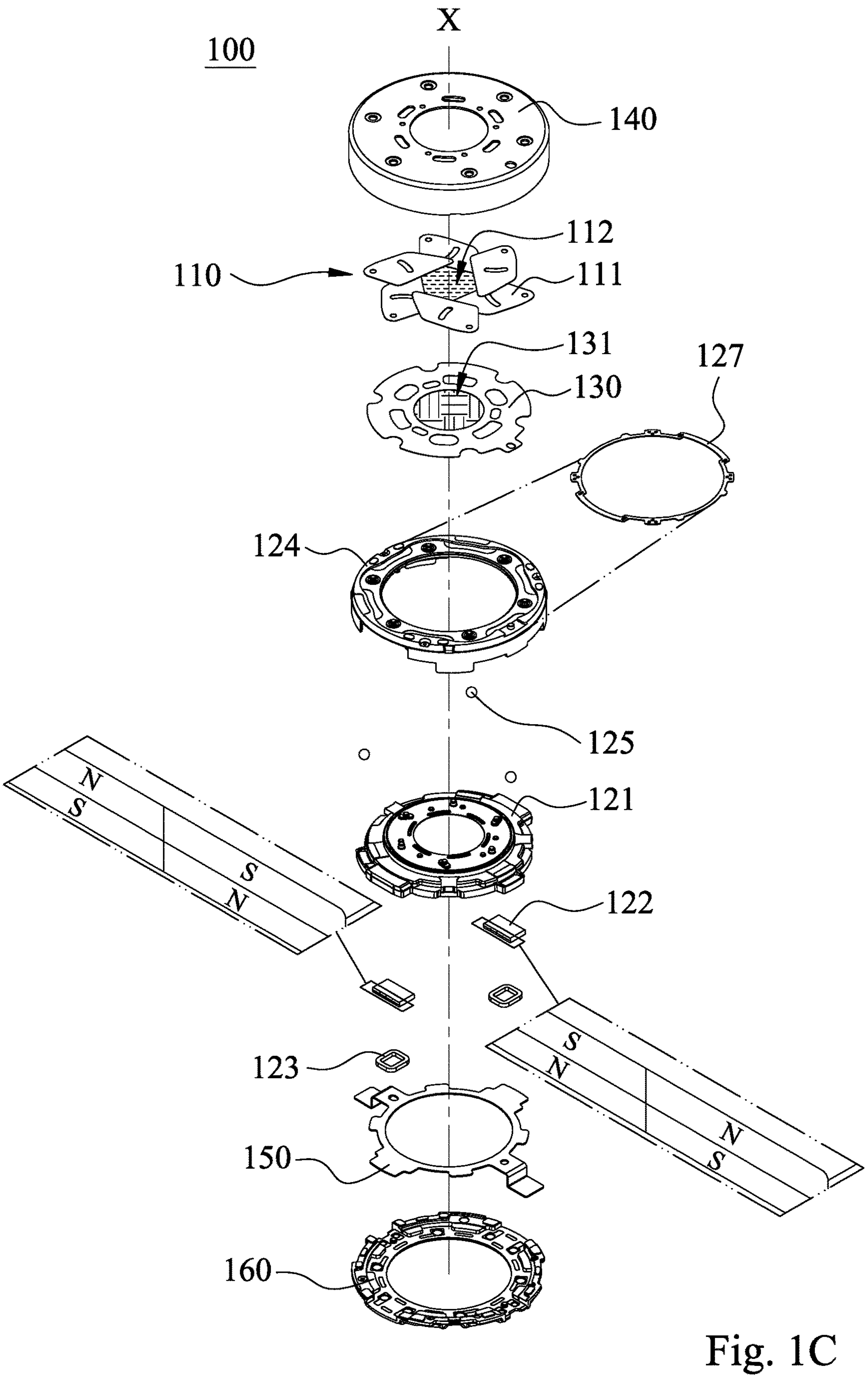
FIG. 1C is another exploded view of the dynamic aperture module according to the 1st embodiment in FIG. 1A.

Please refer to FIG. 1A to FIG. 1C. FIG. 1A is a three-dimensional schematic view of a dynamic aperture module 100 according to the 1st embodiment of the present disclosure. FIG. 1B is an exploded view of the dynamic aperture module 100 according to the 1st embodiment in FIG. 1A. FIG. 1C is another exploded view of the dynamic aperture module 100 according to the 1st embodiment in FIG. 1A. As shown in FIG. 1A to FIG. 1C, the dynamic aperture module 100 includes a blade set 110, a driving portion (its reference numeral is omitted) and a stable hole element 130. The blade set 110 includes a plurality of blades 111. The blades 111 are disposed around an optical axis X to form a light through hole 112 and rotatable for adjusting the light through hole 112. The driving portion includes a rotating element 121, at least one magnet 122, at least one coil 123, a frame element 124 and at least two bearing members 125. In detail, the magnet 122 and the coil 123 drive the rotating element 121 to rotate, and the rotating element 121 and the blades 111 are disposed relatively, so that the blades 111 are rotatable to adjust the dimension of the light through hole 112. In the 1st embodiment, a number of the blades 111 is 6, a number of the magnets 122 is 2, a number of the coils 123 is 2, a number of the bearing members 125 is 3, but the present disclosure is not limited thereto.

Further, the dynamic aperture module 100 can further include an upper cover member 140, a flexible printed circuit board 150 and a base 160, wherein the upper cover member 140 is configured to accommodate the blade set 110, the driving portion and the stable hole element 130. The coils 123 are disposed on the flexible printed circuit board 150, the magnets 122 are disposed on the rotating element 121, and the flexible printed circuit board 150 is disposed on the base 160.

In FIG. 1B and FIG. 1C, the rotating element 121 can rotate relatively to the frame element 124, the rotating element 121 corresponds to the blades 111 and is configured to drive the blades 111 to rotate, so that a dimension of the light through hole 112 is variable. In particular, the magnets 122 and the coils 123 drive the rotating element 121 to rotate relatively to the frame element 124, and the rotating element 121 and the blades 111 are disposed relatively, so that the blades 111 are rotatable to adjust the dimension of the light through hole 112.

The coils 123 correspond to the magnets 122, and one of the magnets 122 and the coils 123 is disposed on the rotating element 121. The magnets 122 and the coils 123 are disposed along the direction parallel to the optical axis X.

Each of the magnets 122 can include four polarities, wherein the polarities of each of the magnets 122 are relatively distributed along a direction surrounding the optical axis X and a direction parallel to the optical axis X, respectively. Thus, the polarities of the magnets 122 can maintain the stability of the magnetic field in a high level.

The bearing members 125 are disposed between the frame element 124 and the rotating element 121 along the direction parallel to the optical axis X, and it is favorable for the rotating element 121 to rotate. Moreover, each of the bearing members 125 can be a ball element, but the present disclosure is not limited thereto. Moreover, the bearing members 125 are aligned to the optical axis X, so that the rotating stability of the rotating element 121 can be enhanced.

Figure 1D:
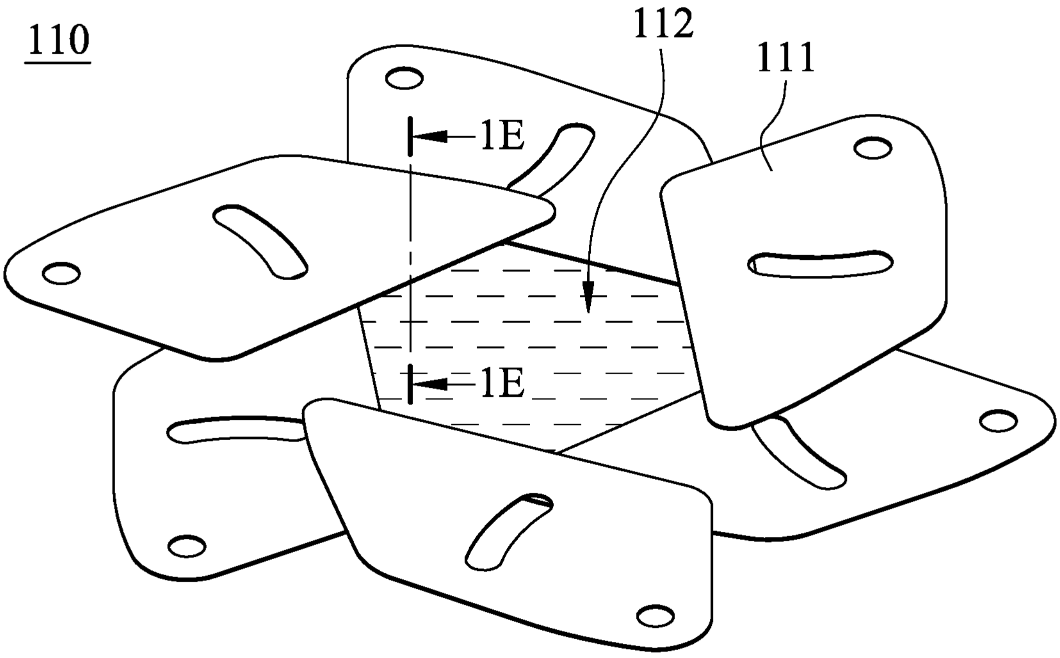
FIG. 1D is a three-dimensional schematic view of the blade set of the dynamic aperture module according to the 1st embodiment in FIG. 1A.
Figure 1E:
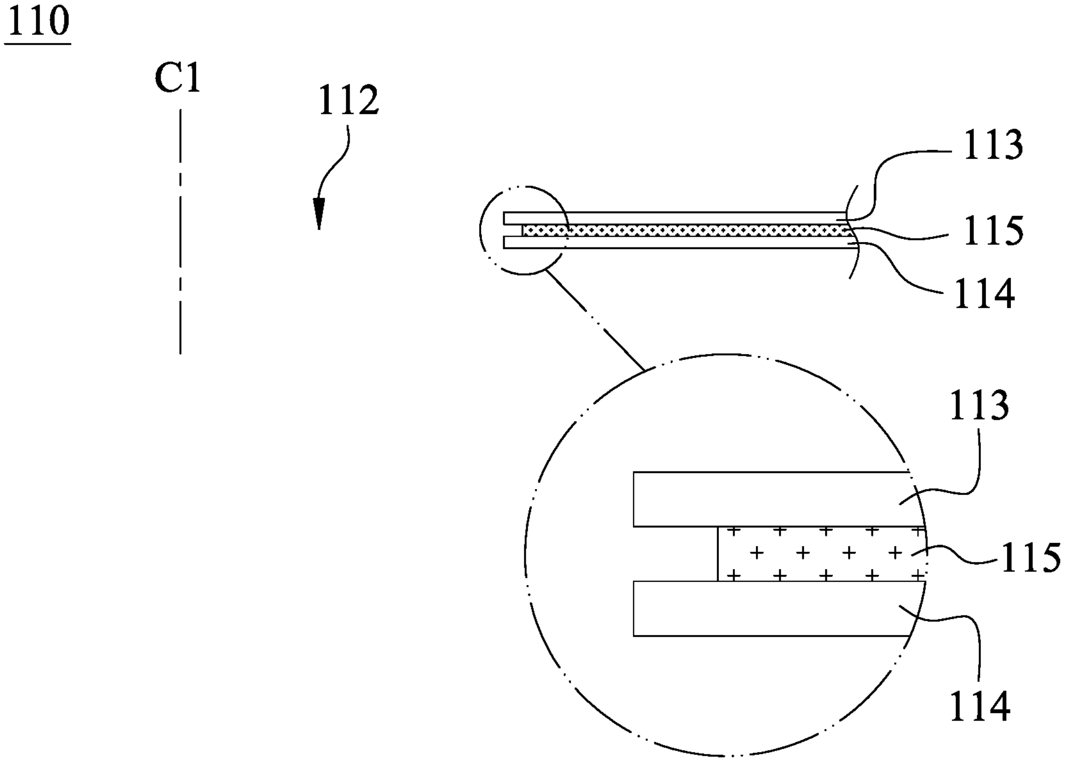
FIG. 1E is a cross-sectional view of the blade set along line 1E-1E in FIG. 1D.

Please refer to FIG. 1D and FIG. 1E. FIG. 1D is a three-dimensional schematic view of the blade set 110 of the dynamic aperture module 100 according to the 1st embodiment in FIG. 1A. FIG. 1E is a cross-sectional view of the blade set 110 along line 1E-1E in FIG. 1D. In FIG. 1B to FIG. 1E, each of the blades 111 includes a first surface layer 113, a second surface layer 114 and an inner substrate layer 115. The inner substrate layer 115 is disposed between the first surface layer 113 and the second surface layer 114. In particular, a composite material form is suitable for thinning manufacturing requirements, and the present disclosure is not limited thereto. Further, the first surface layer 113 and the second surface layer 114 of each of the blades 111 are closer to a center C1 of the light through hole 112 than the inner substrate layer 115 to the center C1 of the light through hole 112. With the interlayer structure, the reflection of the diffused light can be reduced.

Figure 1F:
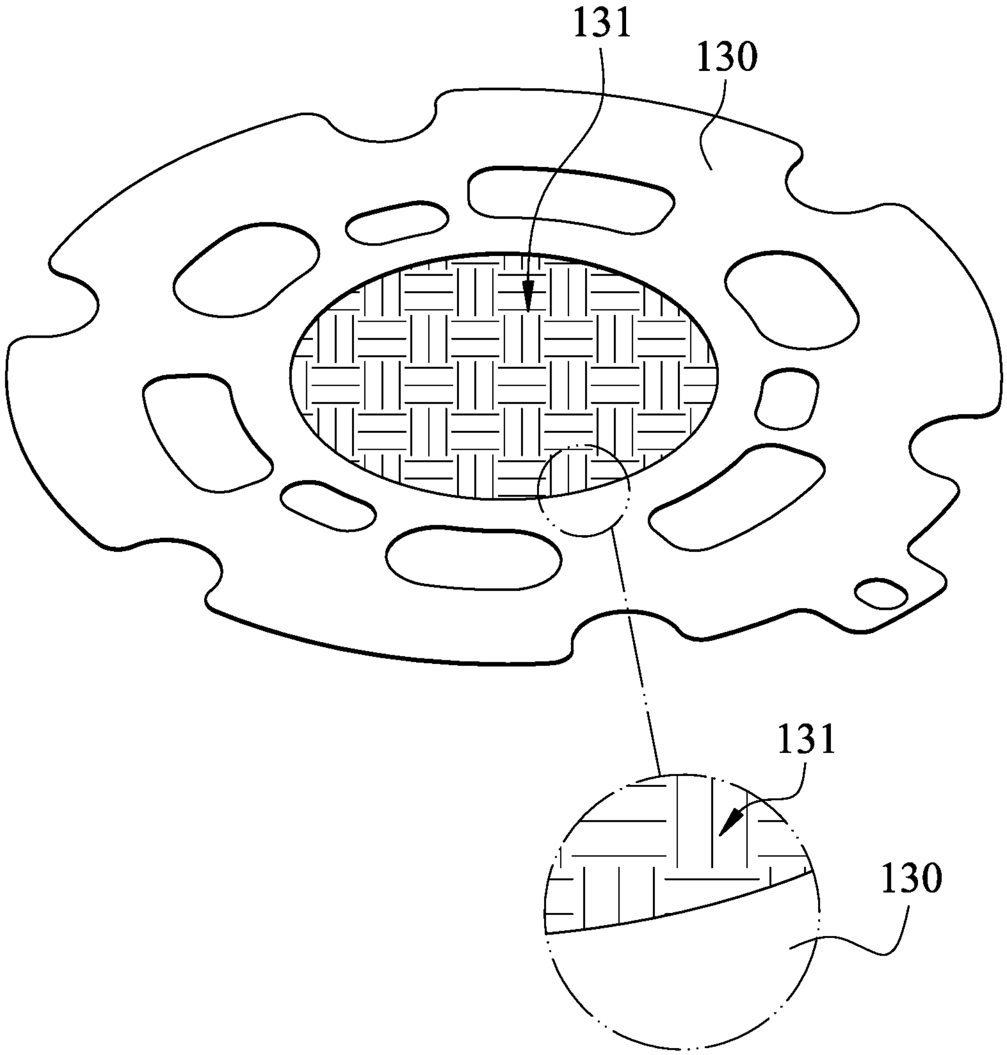
FIG. 1F is a three-dimensional schematic view of the stable hole element of the dynamic aperture module according to the 1st embodiment in FIG. 1A.

FIG. 1F is a three-dimensional schematic view of the stable hole element 130 of the dynamic aperture module 100 according to the 1st embodiment in FIG. 1A. In FIG. 1B, FIG. 1C and FIG. 1E, the stable hole element 130 has a stable hole 131. The stable hole element 130 corresponds to the blade set 110, the stable hole element 130 is adjacent to the blade set 110 and is coaxial with the blade set 110. In detail, the stable hole element 130 is disposed along the direction parallel to the optical axis X, and is below the blade set 110.

In FIG. 1B and FIG. 1C, the frame element 124 is disposed on the rotating element 121 along the direction parallel to the optical axis X. Thus, the rotating element 121 has the sufficient supporting characteristic to support the frame element 124 so as to keep the structural strength thereof and achieve the condition of the mass production. Further, the frame element 124 can include a magnetic element 127, wherein the magnetic element 127 can be insert molded, but the present disclosure is not limited thereto. Furthermore, the magnetic element 127 can interact with the magnets 122 so as to increase the preload force of the frame element 124 to enhance the assembling stability. Or, the magnetic element 127 can interact with the coils 123 so as to maintain the stability of the magnetic field, so that the rotating element 121 can rotate relatively to the frame element 124 stably.

Figure 1G:
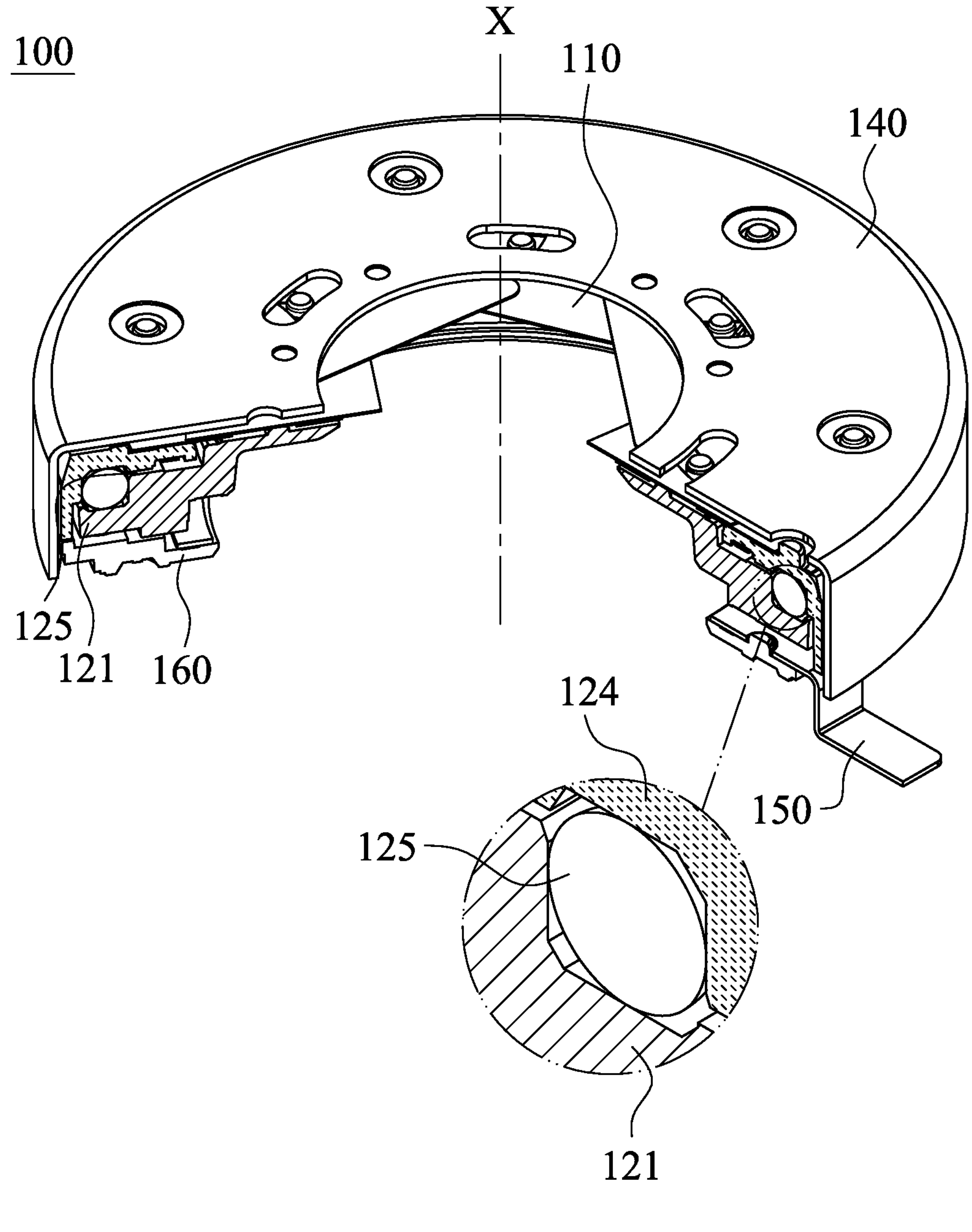
FIG. 1G is a partial cross-sectional view of the dynamic aperture module according to the 1st embodiment in FIG. 1A.
Figure 1H:
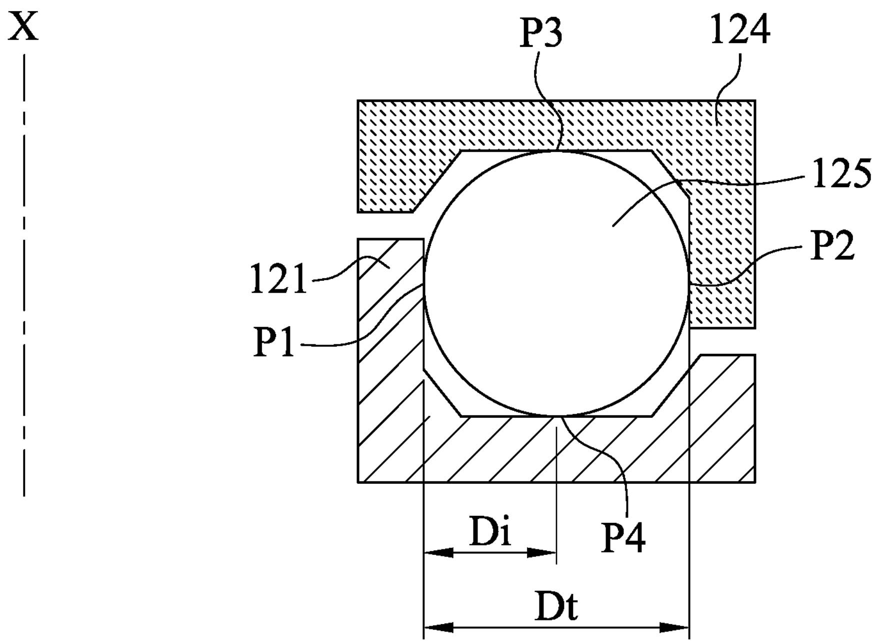
FIG. 1H is a schematic view of the bearing members contacted with the frame element and the rotating element according to the 1st example of the 1st embodiment in FIG. 1G.

Please refer to FIG. 1G and FIG. 1H. FIG. 1G is a partial cross-sectional view of the dynamic aperture module 100 according to the 1st embodiment in FIG. 1A. FIG. 1H is a schematic view of the bearing members 125 contacted with the frame element 124 and the rotating element 121 according to the 1st example of the 1st embodiment in FIG. 1G. In FIG. 1G and FIG. 1H, each of the bearing members 125 can include four contacted points P1, P2, P3, P4, the contacted points P1, P2, P3, P4 can include an inner contacted point, an outer contacted point, an upper contacted point and a lower contacted point, wherein the inner contacted point is one of the contacted points P1, P2, P3, P4 closest to the optical axis X, the outer contacted point is one of the contacted points P1, P2, P3, P4 farthest away from the optical axis X, the upper contacted point and the lower contacted point are two of the contacted points P1, P2, P3, P4 farthest away from each other on the direction parallel to the optical axis X, respectively.

In the 1st example of the 1st embodiment, the contacted point P1 is the inner contacted point, the contacted point P2 is the outer contacted point, the contacted point P3 is the upper contacted point, the contacted point P4 is the lower contacted point, wherein the outer contacted point (that is, the contacted point P2) and the upper contacted point (that is, the contacted point P3) are physically contacted with the frame element 124, and the inner contacted point (that is, the contacted point P1) and the lower contacted point (that is, the contacted point P4) are physically contacted with the rotating element 121. In particular, the positioning alignment between the frame element 124 and the rotating element 121 can be obtained via the bearing members 125, so that the positioning between the elements can be maintained via the bearing members 125 during the rotating process. Hence, the radial positioning between the frame element 124 and the rotating element 121 can be obtained via the inner contacted point and the outer contacted point, and the axial positioning between the frame element 124 and the rotating element 121 can be obtained via the upper contacted point and the lower contacted point.

Moreover, when along a direction vertical to the optical axis X, a distance between the inner contacted point (that is, the contacted point P1) and the outer contacted point (that is, the contacted point P2) is Dt, and a distance between the inner contacted point (that is, the contacted point P1) and the lower contacted point (that is, the contacted point P4) is Di, Di/Dt=0.5.

Figure 1I:
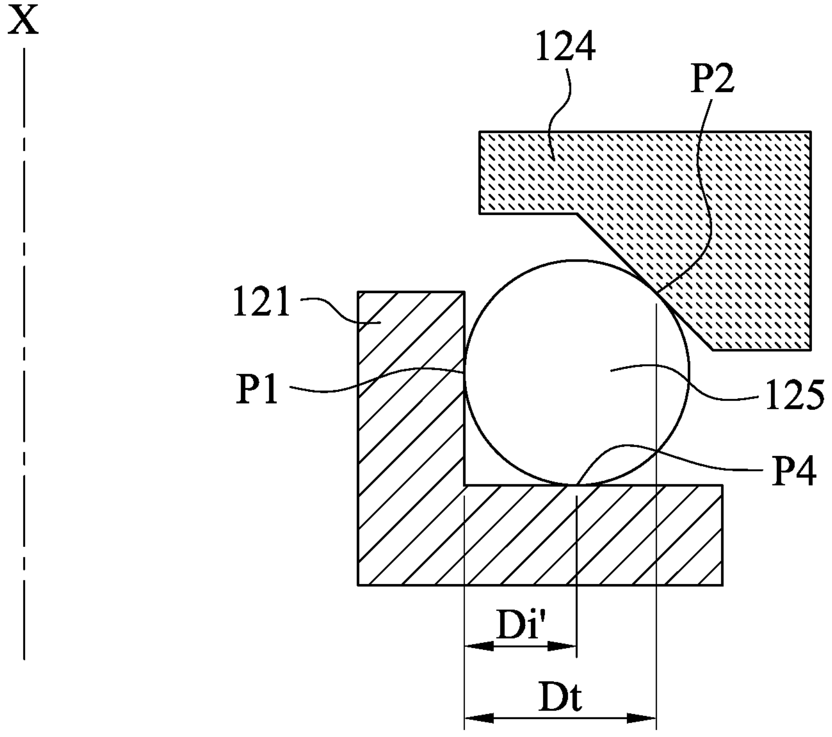
FIG. 1I is a schematic view of the bearing members contacted with the frame element and the rotating element according to the 2nd example of the 1st embodiment in FIG. 1G.

FIG. 1I is a schematic view of the bearing members 125 contacted with the frame element 124 and the rotating element 121 according to the 2nd example of the 1st embodiment in FIG. 1G. As shown in FIG. 1I, each of the bearing members 125 can include three contacted points P1, P2, P4, the contacted points P1, P2, P4 includes an inner contacted point, an outer contacted point, an upper contacted point and a lower contacted point, wherein the inner contacted point is one of the contacted points P1, P2, P4 closest to the optical axis X, the outer contacted point is one of the contacted points P1, P2, P4 farthest away from the optical axis X, the upper contacted point and the lower contacted point are two of the contacted points P1, P2, P4 farthest away from each other on the direction parallel to the optical axis X, respectively. One of the contacted points P1, P2, P4 is simultaneously one of the inner contacted point and the outer contacted point and one of the upper contacted point and the lower contacted point.

In the 2nd example of the 1st embodiment, the contacted point P1 is the inner contacted point, the contacted point P2 is the outer contacted point, and the contacted point P4 is the lower contacted point, wherein the contacted point P2 is simultaneously the upper contacted point. The outer contacted point (that is, the contacted point P2) is physically contacted with the frame element 124, and the inner contacted point (that is, the contacted point P1) and the lower contacted point (that is, the contacted point P4) are physically contacted with the rotating element 121. Hence, the radial positioning and the axial supporting between the frame element 124 and the rotating element 121 can be more accurate via the design of the position of the different contacted points, so that the image quality of the imaging lens assembly module can be enhanced.

Further, when along the direction vertical to the optical axis X, the distance between the inner contacted point (that is, the contacted point P1) and the outer contacted point (that is, the contacted point P2) is Dt, and a distance between a remaining one (that is, the contacted point P4) of the contacted points P1, P2, P4 and the inner contacted point is Di', Di'/Dt=0.59.

Figure 1J:
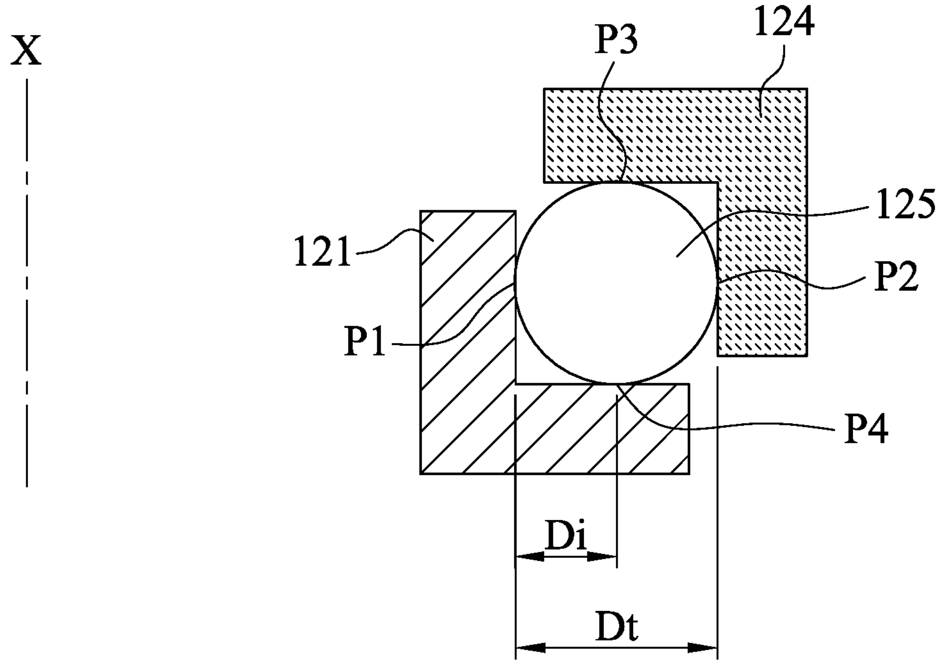
FIG. 1J is a schematic view of the bearing members contacted with the frame element and the rotating element according to the 3rd example of the 1st embodiment in FIG. 1G.

FIG. 1J is a schematic view of the bearing members 125 contacted with the frame element 124 and the rotating element 121 according to the 3rd example of the 1st embodiment in FIG. 1G. In FIG. 1J, each of the bearing members 125 can include four contacted points P1, P2, P3, P4, wherein the contacted point P1 is the inner contacted point, the contacted point P2 is the outer contacted point, the contacted point P3 is the upper contacted point, the contacted point P4 is the lower contacted point, wherein the outer contacted point (that is, the contacted point P2) and the upper contacted point (that is, the contacted point P3) are physically contacted with the frame element 124, and the inner contacted point (that is, the contacted point P1) and the lower contacted point (that is, the contacted point P4) are physically contacted with the rotating element 121.

In the 3rd example of the 1st embodiment, when along the direction vertical to the optical axis X, the distance between the inner contacted point (that is, the contacted point P1) and the outer contacted point (that is, the contacted point P2) is Dt, and the distance between the inner contacted point (that is, the contacted point P1) and the lower contacted point (that is, the contacted point P4) is Di, Di/Dt=0.5.

Figure 1K:
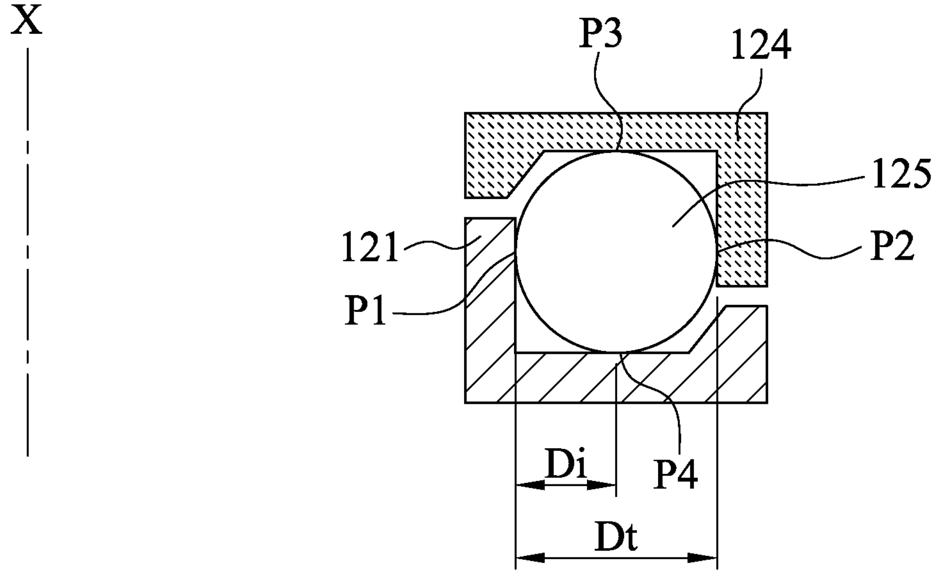
FIG. 1K is a schematic view of the bearing members contacted with the frame element and the rotating element according to the 4th example of the 1st embodiment in FIG. 1G.

FIG. 1K is a schematic view of the bearing members 125 contacted with the frame element 124 and the rotating element 121 according to the 4th example of the 1st embodiment in FIG. 1G. In FIG. 1K, each of the bearing members 125 can include four contacted points P1, P2, P3, P4, wherein the contacted point P1 is the inner contacted point, the contacted point P2 is the outer contacted point, the contacted point P3 is the upper contacted point, the contacted point P4 is the lower contacted point, wherein the outer contacted point (that is, the contacted point P2) and the upper contacted point (that is, the contacted point P3) are physically contacted with the frame element 124, and the inner contacted point (that is, the contacted point P1) and the lower contacted point (that is, the contacted point P4) are physically contacted with the rotating element 121.

In the 4th example of the 1st embodiment, when along the direction vertical to the optical axis X, a distance between the inner contacted point (that is, the contacted point P1) and the outer contacted point (that is, the contacted point P2) is Dt, and the distance between the inner contacted point (that is, the contacted point P1) and the lower contacted point (that is, the contacted point P4) is Di, Di/Dt=0.5.

Figure 1L:
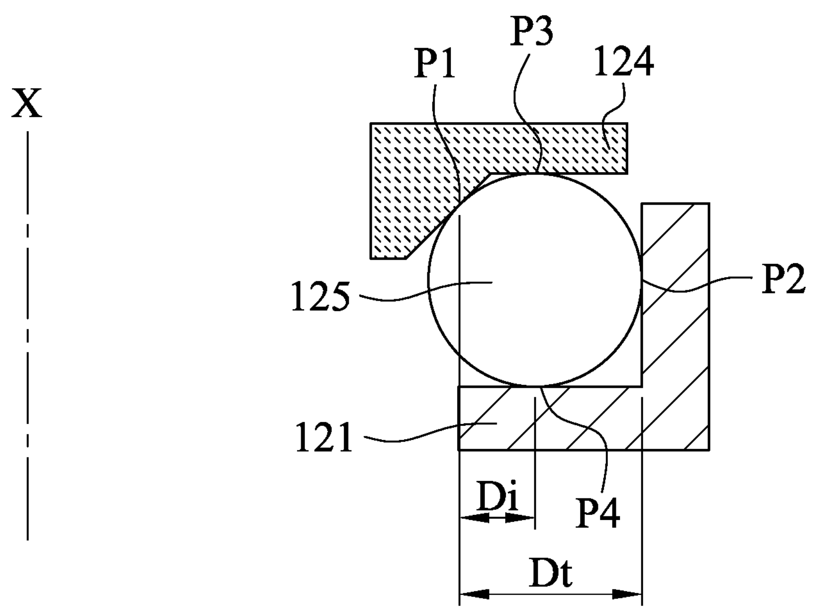
FIG. 1L is a schematic view of the bearing members contacted with the frame element and the rotating element according to the 5th example of the 1st embodiment in FIG. 1G.

FIG. 1L is a schematic view of the bearing members 125 contacted with the frame element 124 and the rotating element 121 according to the 5th example of the 1st embodiment in FIG. 1G. In FIG. 1L, each of the bearing members 125 can include four contacted points P1, P2, P3, P4, wherein the contacted point P1 is the inner contacted point, the contacted point P2 is the outer contacted point, the contacted point P3 is the upper contacted point, the contacted point P4 is the lower contacted point, wherein the inner contacted point (that is, the contacted point P1) and the upper contacted point (that is, the contacted point P3) are physically contacted with the frame element 124, and the outer contacted point (that is, the contacted point P2) and the lower contacted point (that is, the contacted point P4) are physically contacted with the rotating element 121.

In the 5th example of the 1st embodiment, when along the direction vertical to the optical axis X, the distance between the inner contacted point (that is, the contacted point P1) and the outer contacted point (that is, the contacted point P2) is Dt, and the distance between the inner contacted point (that is, the contacted point P1) and the lower contacted point (that is, the contacted point P4) is Di, Di/Dt=0.41.

Figure 1M:
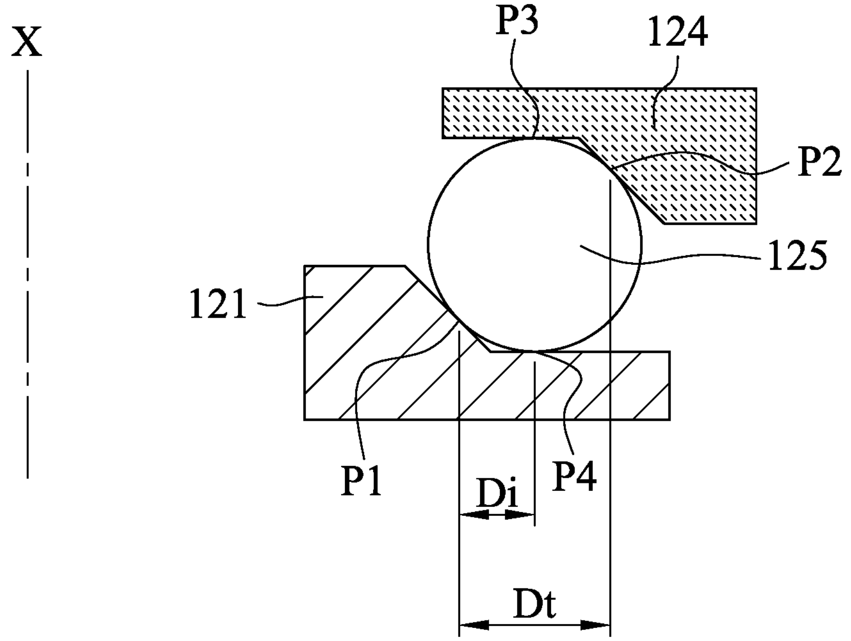
FIG. 1M is a schematic view of the bearing members contacted with the frame element and the rotating element according to the 6th example of the 1st embodiment in FIG. 1G.

FIG. 1M is a schematic view of the bearing members 125 contacted with the frame element 124 and the rotating element 121 according to the 6th example of the 1st embodiment in FIG. 1G. In FIG. 1M, each of the bearing members 125 can include four contacted points P1, P2, P3, P4, wherein the contacted point P1 is the inner contacted point, the contacted point P2 is the outer contacted point, the contacted point P3 is the upper contacted point, the contacted point P4 is the lower contacted point, wherein the outer contacted point (that is, the contacted point P2) and the upper contacted point (that is, the contacted point P3) are physically contacted with the frame element 124, and the inner contacted point (that is, the contacted point P1) and the lower contacted point (that is, the contacted point P4) are physically contacted with the rotating element 121.

In the 6th example of the 1st embodiment, when along the direction vertical to the optical axis X, the distance between the inner contacted point (that is, the contacted point P1) and the outer contacted point (that is, the contacted point P2) is Dt, and the distance between the inner contacted point (that is, the contacted point P1) and the lower contacted point (that is, the contacted point P4) is Di, Di/Dt=0.5.

Figure 1N:
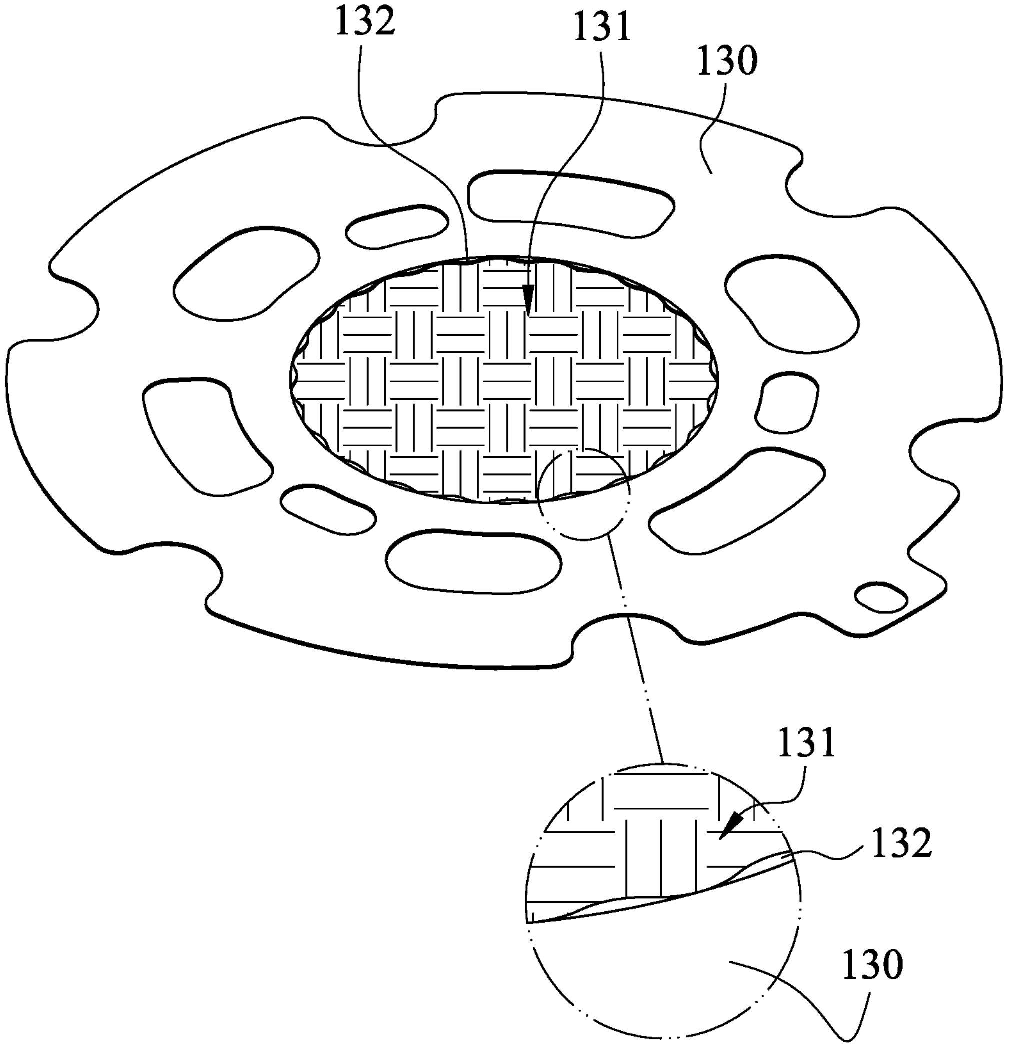
FIG. 1N is a three-dimensional schematic view of the stable hole element according to the 7th example of the 1st embodiment in FIG. 1A.

FIG. 1N is a three-dimensional schematic view of the stable hole element 130 according to the 7th example of the 1st embodiment in FIG. 1A. In FIG. 1N, the stable hole element 130 can include a plurality of light blocking structures 132. The light blocking structures 132 are adjacent to the stable hole 131. In particular, the light blocking structures 132 can block a stray light.

It should be mentioned that, in FIG. 1B to FIG. 1D, FIG. 1F and FIG. 1N, the horizontal-lined mesh and the interwoven mesh are configured to indicate the light through hole 112 and the stable hole 131, respectively.

2nd Embodiment

Figure 2A:
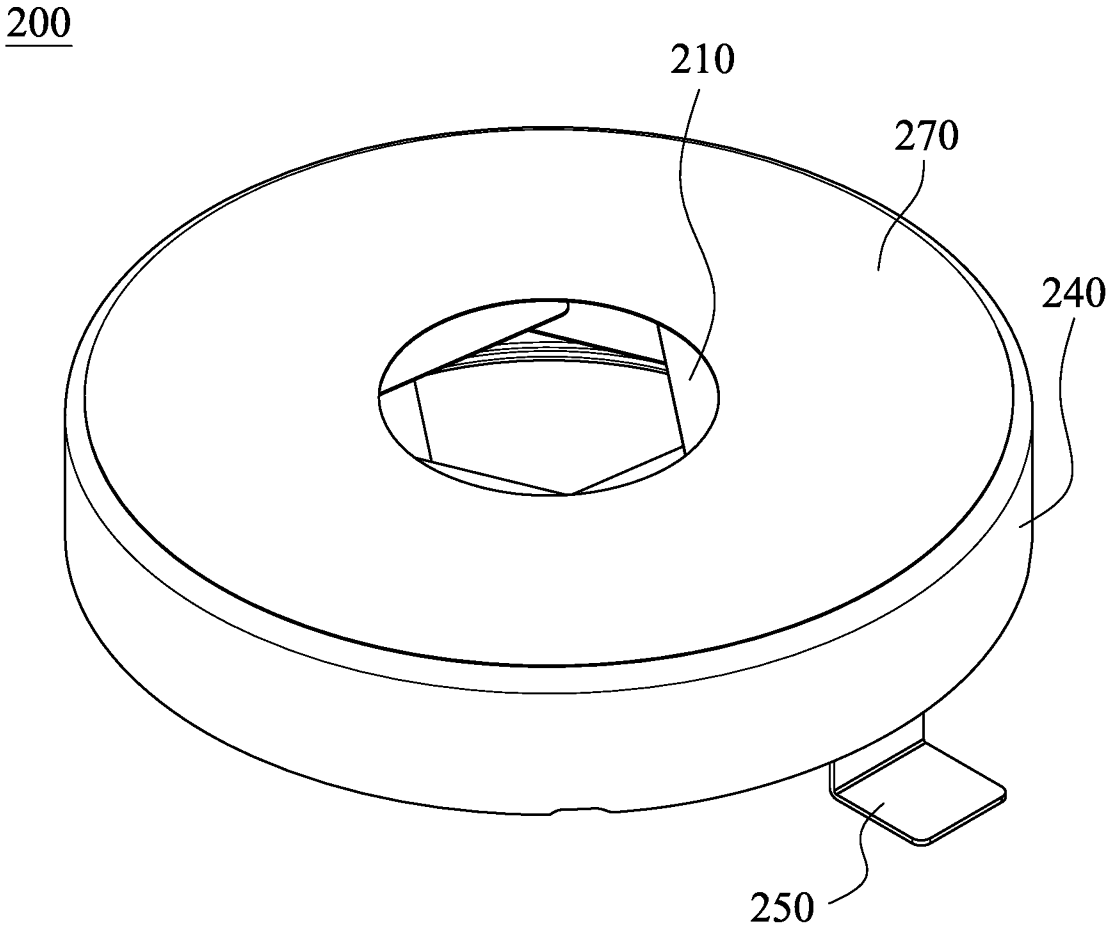
FIG. 2A is a three-dimensional schematic view of a dynamic aperture module according to the 2nd embodiment of the present disclosure.
Figure 2B:
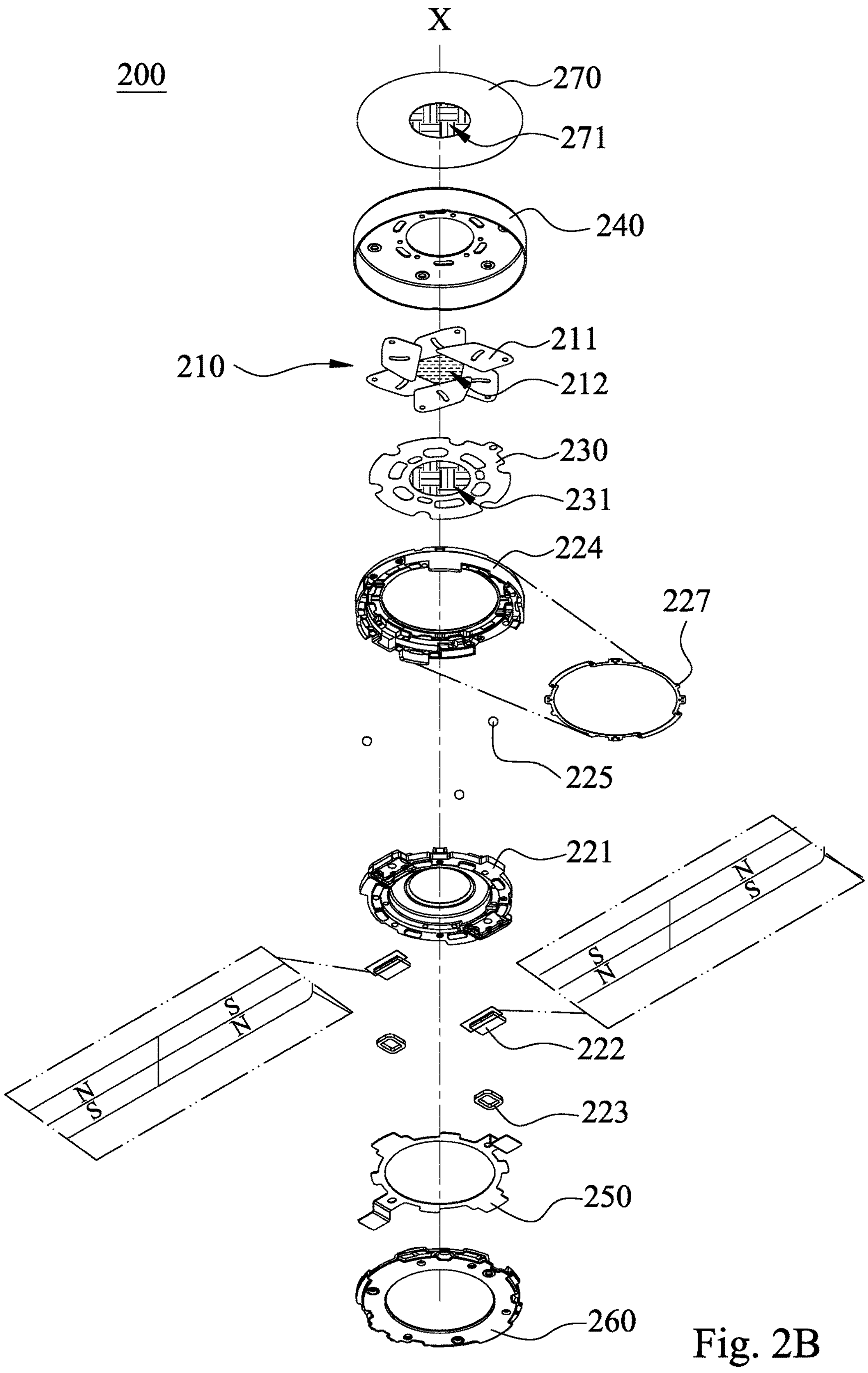
FIG. 2B is an exploded view of the dynamic aperture module according to the 2nd embodiment in FIG. 2A.
Figure 2C:
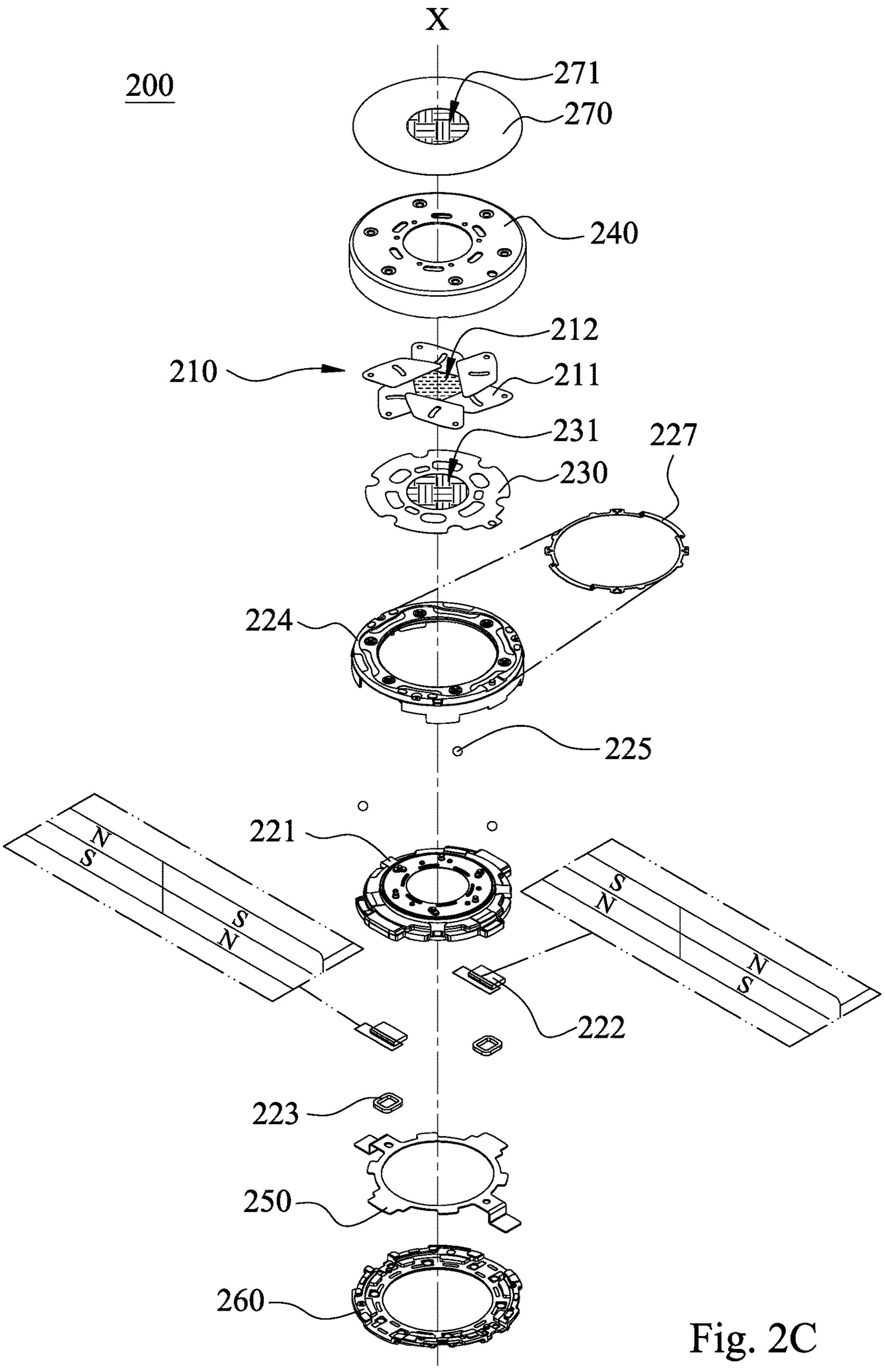
FIG. 2C is another exploded view of the dynamic aperture module according to the 2nd embodiment in FIG. 2A.

Please refer to FIG. 2A to FIG. 2C. FIG. 2A is a three-dimensional schematic view of a dynamic aperture module 200 according to the 2nd embodiment of the present disclosure. FIG. 2B is an exploded view of the dynamic aperture module 200 according to the 2nd embodiment in FIG. 2A. FIG. 2C is another exploded view of the dynamic aperture module 200 according to the 2nd embodiment in FIG. 2A. As shown in FIG. 2A to FIG. 2C, the dynamic aperture module 200 includes a blade set 210, a driving portion (its reference numeral is omitted) and a stable hole element 230. The blade set 210 includes a plurality of blades 211. The blades 211 are disposed around an optical axis X to form a light through hole 212 and rotatable for adjusting the light through hole 212. The driving portion includes a rotating element 221, at least one magnet 222, at least one coil 223, a frame element 224 and at least two bearing members 225. In detail, the magnet 222 and the coil 223 drive the rotating element 221 to rotate, and the rotating element 221 and the blades 211 are disposed relatively, so that the blades 211 are rotatable to adjust the dimension of the light through hole 212. In the 2nd embodiment, a number of the blades 211 is 6, a number of the magnets 222 is 2, a number of the coils 223 is 2, a number of the bearing members 225 is 3, but the present disclosure is not limited thereto.

Moreover, the dynamic aperture module 200 can further include an upper cover member 240, a flexible printed circuit board 250, a base 260 and a light blocking element 270, wherein the upper cover member 240 is configured to accommodate the blade set 210, the driving portion and the stable hole element 230. The coils 223 are disposed on the flexible printed circuit board 250, the magnets 222 are disposed on the rotating element 221, the flexible printed circuit board 250 is disposed on the base 260, and the light blocking element 270 and the stable hole element 230 are disposed relatively to the blade set 210, respectively. In detail, the light blocking element 270 has a through hole 271, the light blocking element 270 and the stable hole element 230 are disposed along the direction parallel to the optical axis X. The light blocking element 270 is disposed above the blade set 210, and the stable hole element 230 is disposed below the blade set 210.

In FIG. 2B and FIG. 2C, the rotating element 221 can rotate relatively to the frame element 224, the rotating element 221 corresponds to the blades 211 and is configured to drive the blades 211 to rotate, so that a dimension of the light through hole 212 is variable. In particular, the magnets 222 and the coils 223 drive the rotating element 221 to rotate relatively to the frame element 224, the rotating element 221 and the blades 211 are disposed relatively, so that the blades 211 are rotatable to adjust the dimension of the light through hole 212.

The coils 223 correspond to the magnets 222, and one of the magnets 222 and the coils 223 is disposed on the rotating element 221. The magnets 222 and the coils 223 are disposed along a direction parallel to the optical axis X.

Each of the magnets 222 can include four polarities, wherein the polarities of each of the magnets 222 are relatively distributed along a direction surrounding the optical axis X and the direction parallel to the optical axis X, respectively. Thus, the polarities of the magnets 222 can maintain the stability of the magnetic field in a high level.

The bearing members 225 are disposed between the frame element 224 and the rotating element 221 along the direction parallel to the optical axis X, and it is favorable for the rotating element 221 to rotate. Moreover, each of the bearing members 225 can be a ball element, but the present disclosure is not limited thereto. Further, the bearing members 225 are aligned to the optical axis X, so that the rotating stability of the rotating element 221 can be enhanced.

Figure 2D:
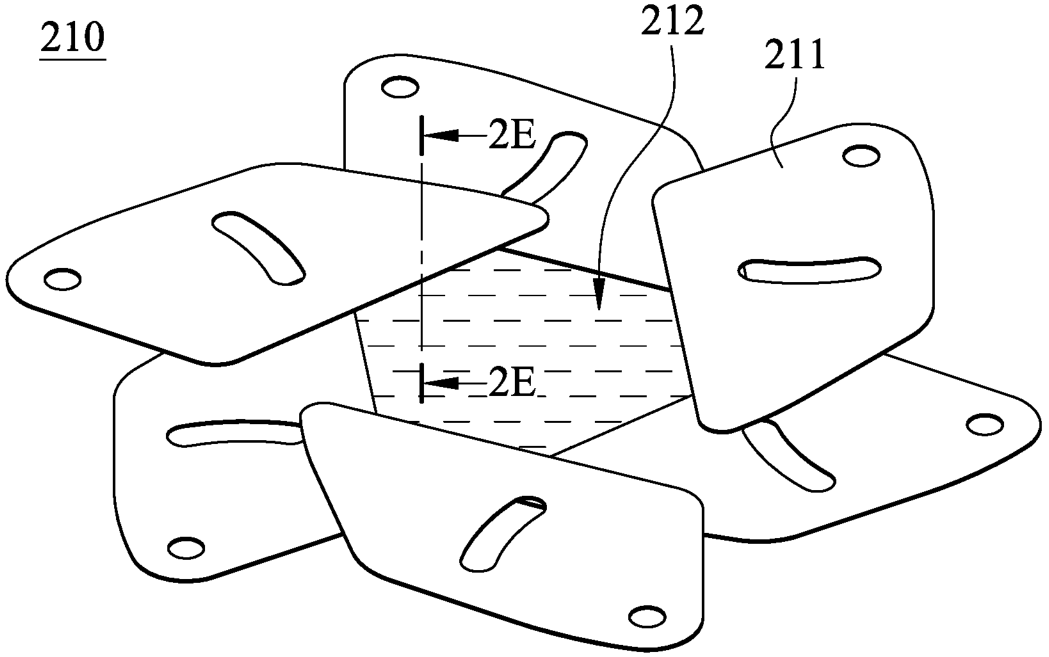
FIG. 2D is a three-dimensional schematic view of the blade set of the dynamic aperture module according to the 2nd embodiment in FIG. 2A.
Figure 2E:
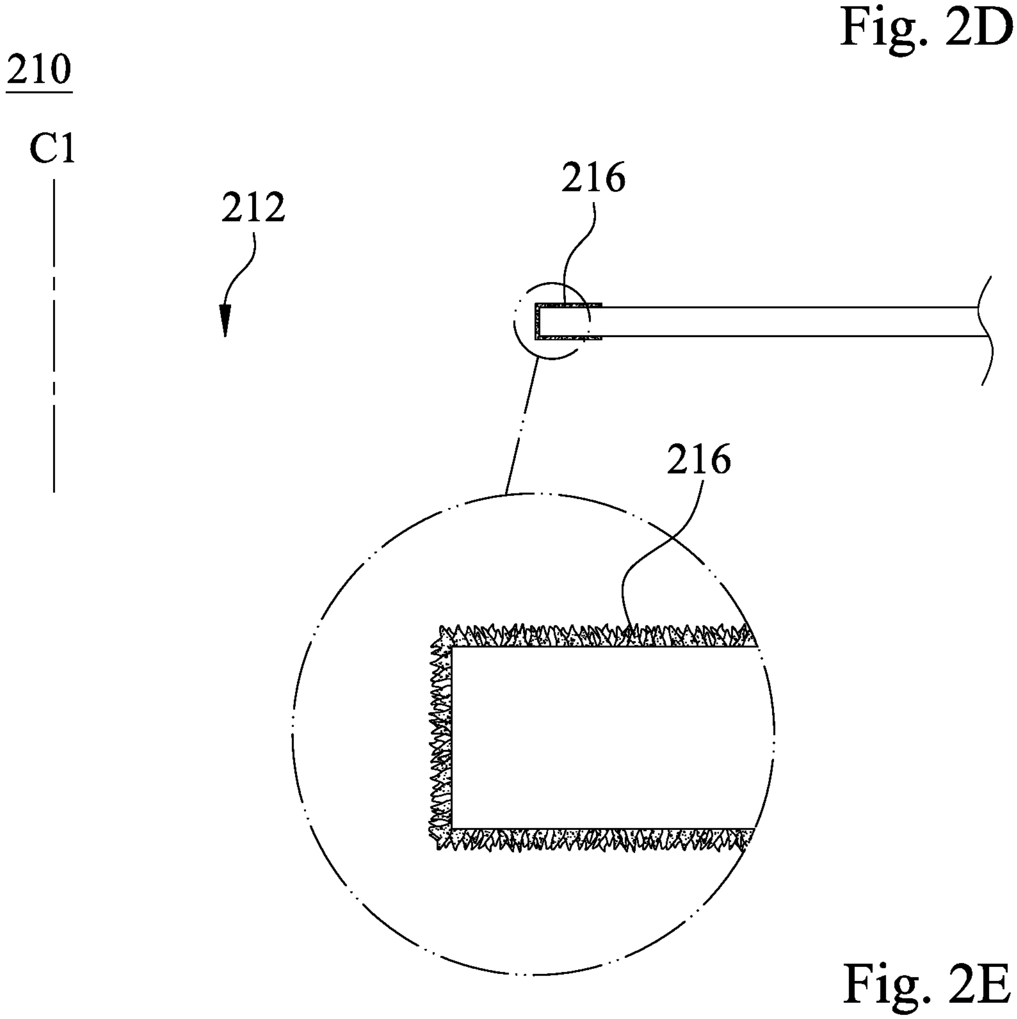
FIG. 2E is a cross-sectional view of the blade set along line 2E-2E in FIG. 2D.

Please refer to FIG. 2D and FIG. 2E. FIG. 2D is a three-dimensional schematic view of the blade set 210 of the dynamic aperture module 200 according to the 2nd embodiment in FIG. 2A. FIG. 2E is a cross-sectional view of the blade set 210 along line 2E-2E in FIG. 2D. As shown in FIG. 2D and FIG. 2E, each of the blades 211 can include a nanostructure layer 216, wherein the nanostructure layer 216 has a plurality of irregular protrusions, and an average height of the nanostructure layer 216 can be between 85 nm to 255 nm. With the aforementioned range of the average height, a better anti-reflective effect can be obtained without impacting the imaging quality.

Figure 2F:
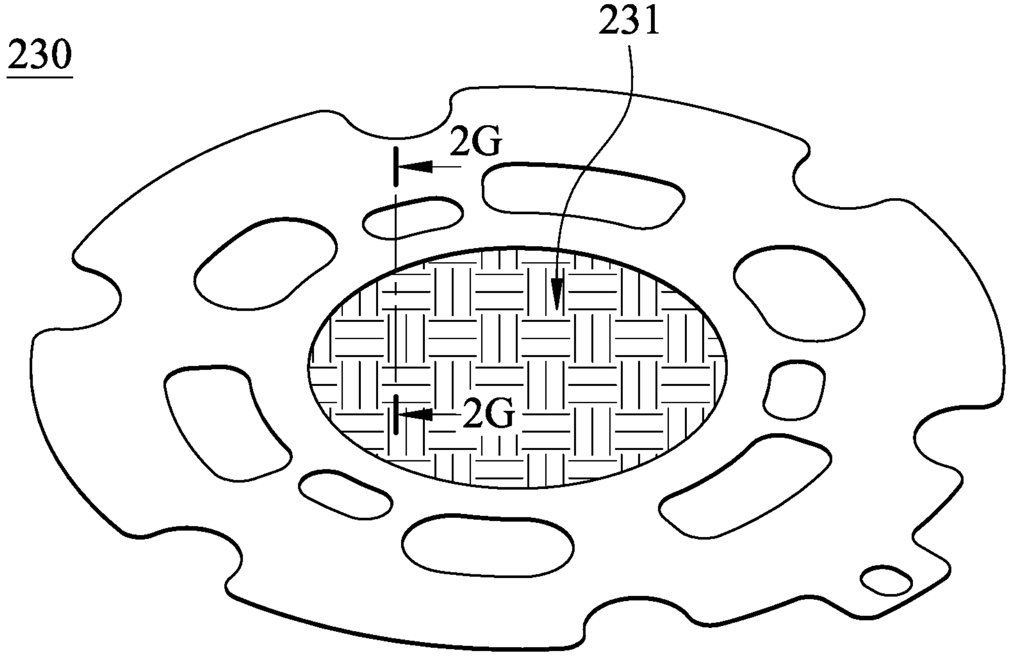
FIG. 2F is a three-dimensional schematic view of the stable hole element of the dynamic aperture module according to the 2nd embodiment in FIG. 2A.
Figure 2G:
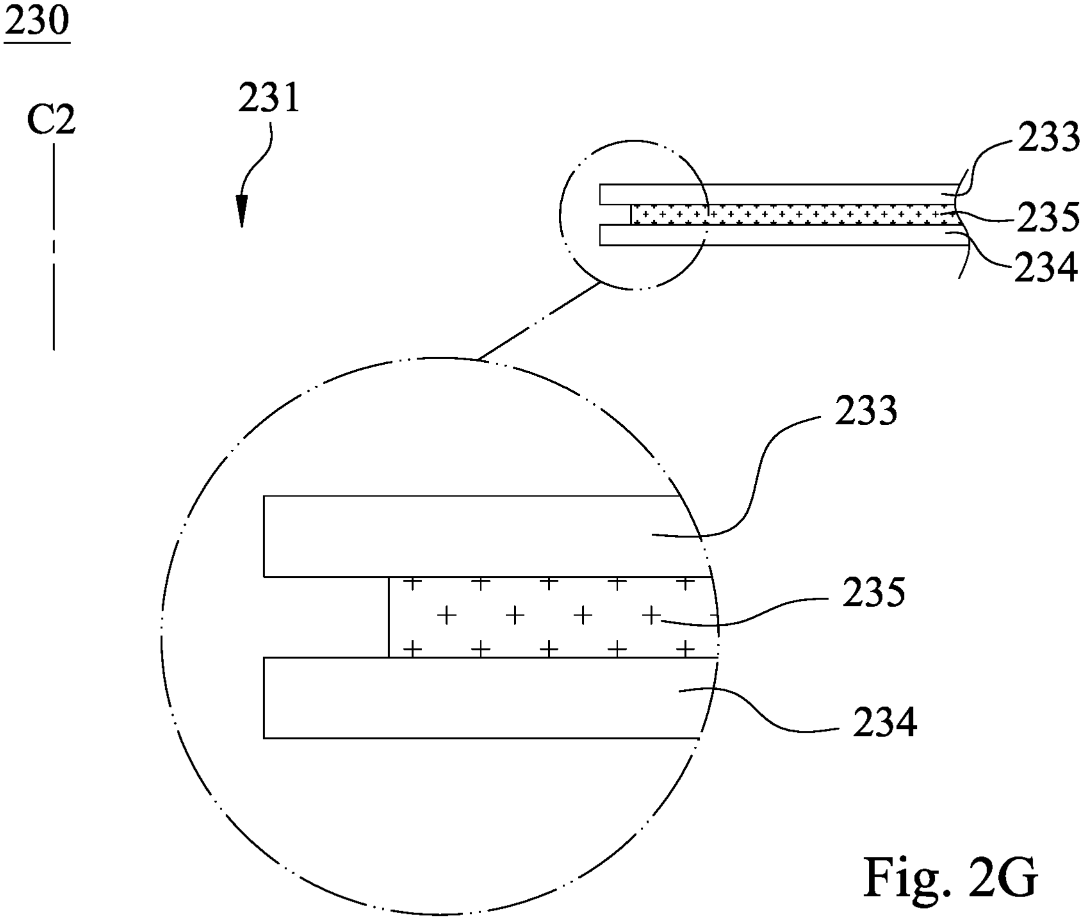
FIG. 2G is a cross-sectional view of the stable hole element along line 2G-2G in FIG. 2F.

Please refer to FIG. 2F and FIG. 2G. FIG. 2F is a three-dimensional schematic view of the stable hole element 230 of the dynamic aperture module 200 according to the 2nd embodiment in FIG. 2A. FIG. 2G is a cross-sectional view of the stable hole element 230 along line 2G-2G in FIG. 2F. In FIG. 2B, FIG. 2C, FIG. 2F and FIG. 2G, the stable hole 230 has a stable hole 231, and the stable hole element 230 includes a first surface layer 233, a second surface layer 234 and an inner substrate layer 235. The stable hole element 230 corresponds to the blade set 210, the stable hole element 230 is adjacent to the blade set 210 and is coaxial with the blade set 210. The inner substrate layer 235 is disposed between the first surface layer 233 and the second surface layer 234. Further, the first surface layer 233 and the second surface layer 234 of the stable hole element 230 are closer to a center C2 of the light through hole 212 than the inner substrate layer 235 to the center C2 of the light through hole 212. With the interlayer structure, the reflection of the diffused light can be reduced.

As shown in FIG. 2B and FIG. 2C, the frame element 224 can include a magnetic element 227, wherein the magnetic element 227 can be insert molded, but the present disclosure is not limited thereto. Furthermore, the magnetic element 227 can interact with the magnets 222 so as to increase the preload force of the frame element 224 to enhance the assembling stability. Or, the magnetic element 227 can interact with the coils 223 so as to maintain the stability of the magnetic field, so that the rotating element 221 can rotate relatively to the frame element 224 stably.

Figure 2H:
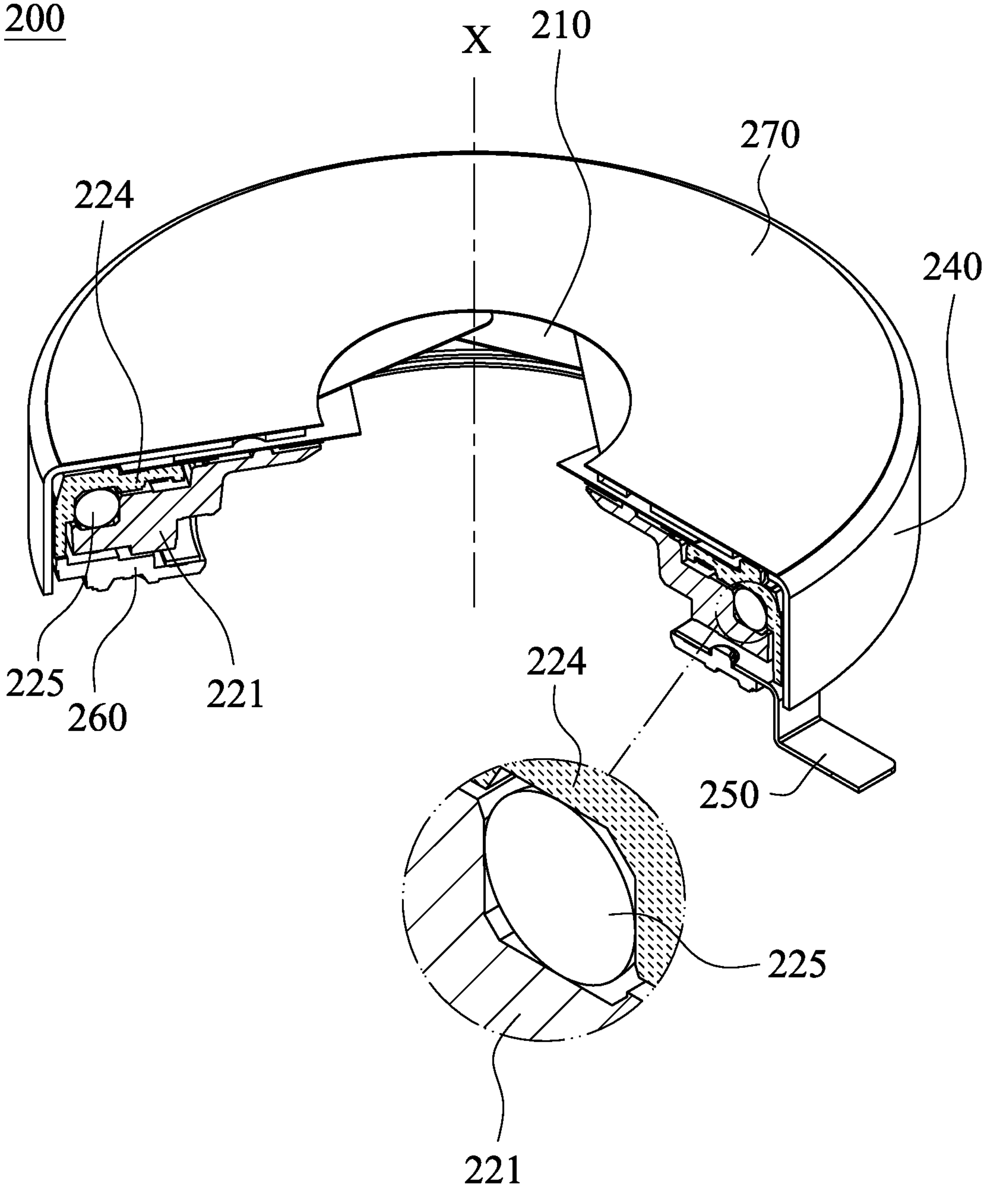
FIG. 2H is a partial cross-sectional view of the dynamic aperture module according to the 2nd embodiment in FIG. 2A.

FIG. 2H is a partial cross-sectional view of the dynamic aperture module 200 according to the 2nd embodiment in FIG. 2A. As shown in FIG. 2H, each of the bearing members 225 can include four contacted points (its reference numerals are omitted), and the contacted points are physically contacted with the frame element 224 or the rotating element 221. The contacted points include an inner contacted point, an outer contacted point, an upper contacted point and a lower contacted point, wherein the inner contacted point is one of the contacted points closest to the optical axis X, the outer contacted point is one of the contacted points farthest away from the optical axis X, the upper contacted point and the lower contacted point are two of the contacted points farthest away from each other on the direction parallel to the optical axis X, respectively.

It should be mentioned that, in FIG. 2B, FIG. 2C and FIG. 2F, the interwoven mesh is configured to indicate the stable hole 231 and the through hole 271. In FIG. 2B to FIG. 2D, the horizontal-lined mesh is configured to indicate the light through hole 212.

3rd Embodiment

Figure 3A:
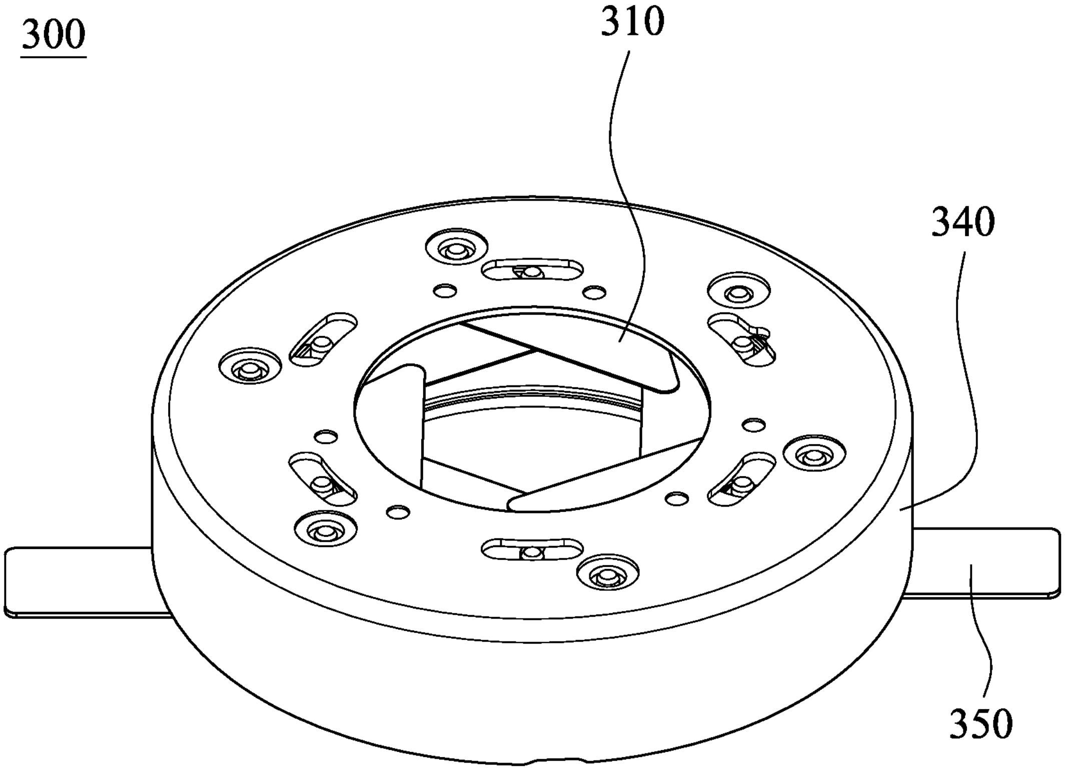
FIG. 3A is a three-dimensional schematic view of a dynamic aperture module according to the 3rd embodiment of the present disclosure.
Figure 3B:
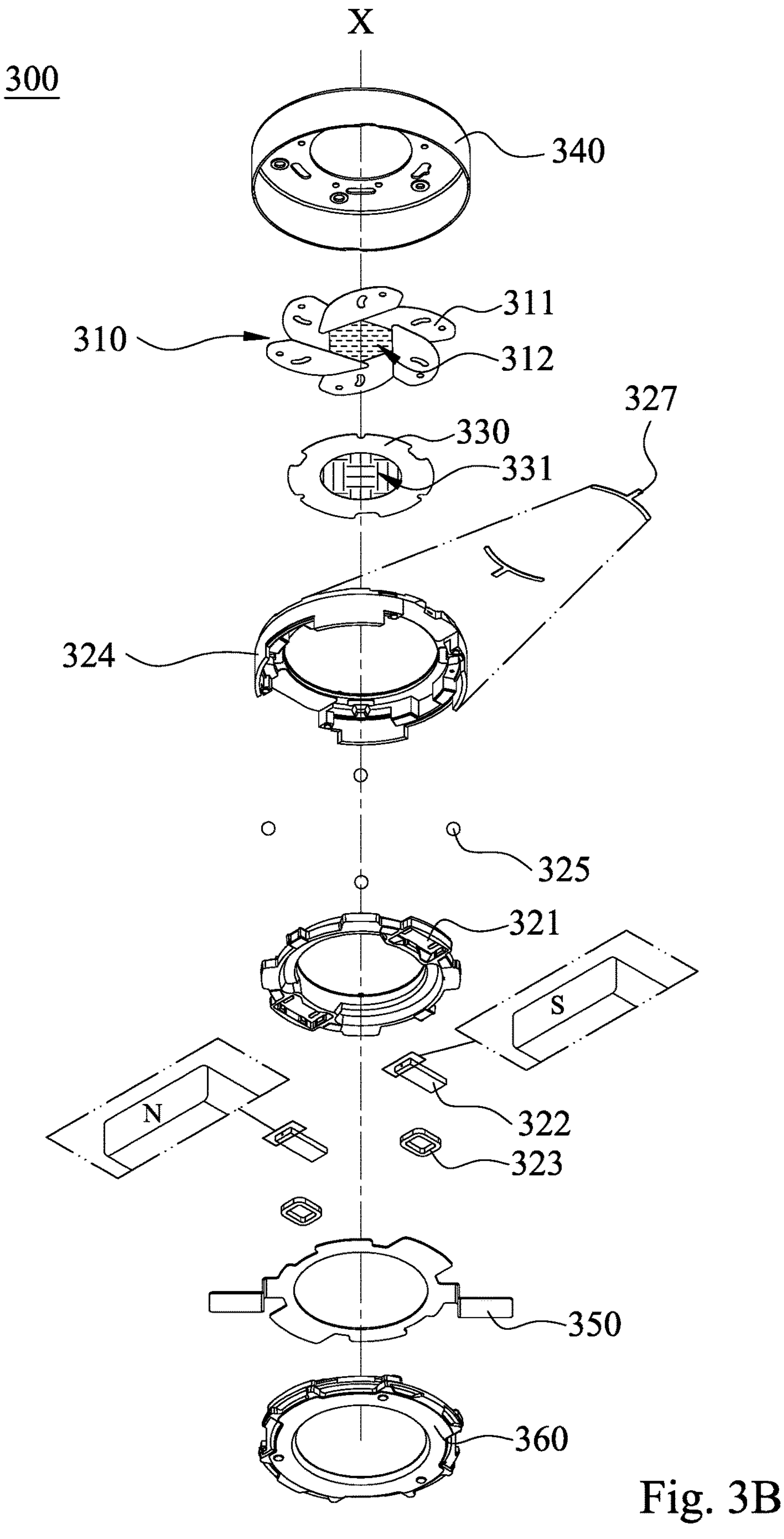
FIG. 3B is an exploded view of the dynamic aperture module according to the 3rd embodiment in FIG. 3A.
Figure 3C:
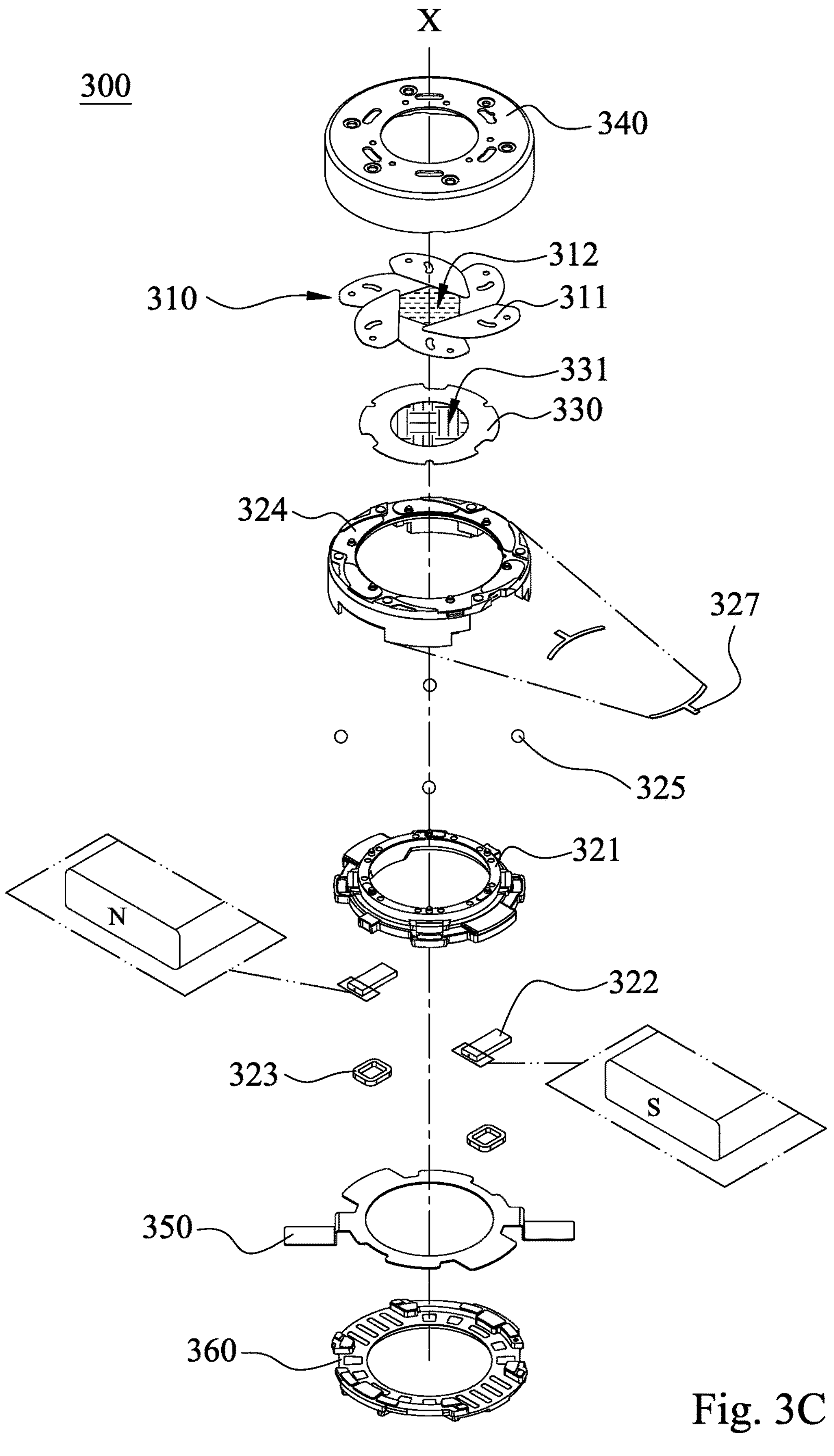
FIG. 3C is another exploded view of the dynamic aperture module according to the 3rd embodiment in FIG. 3A.
Figure 3D:
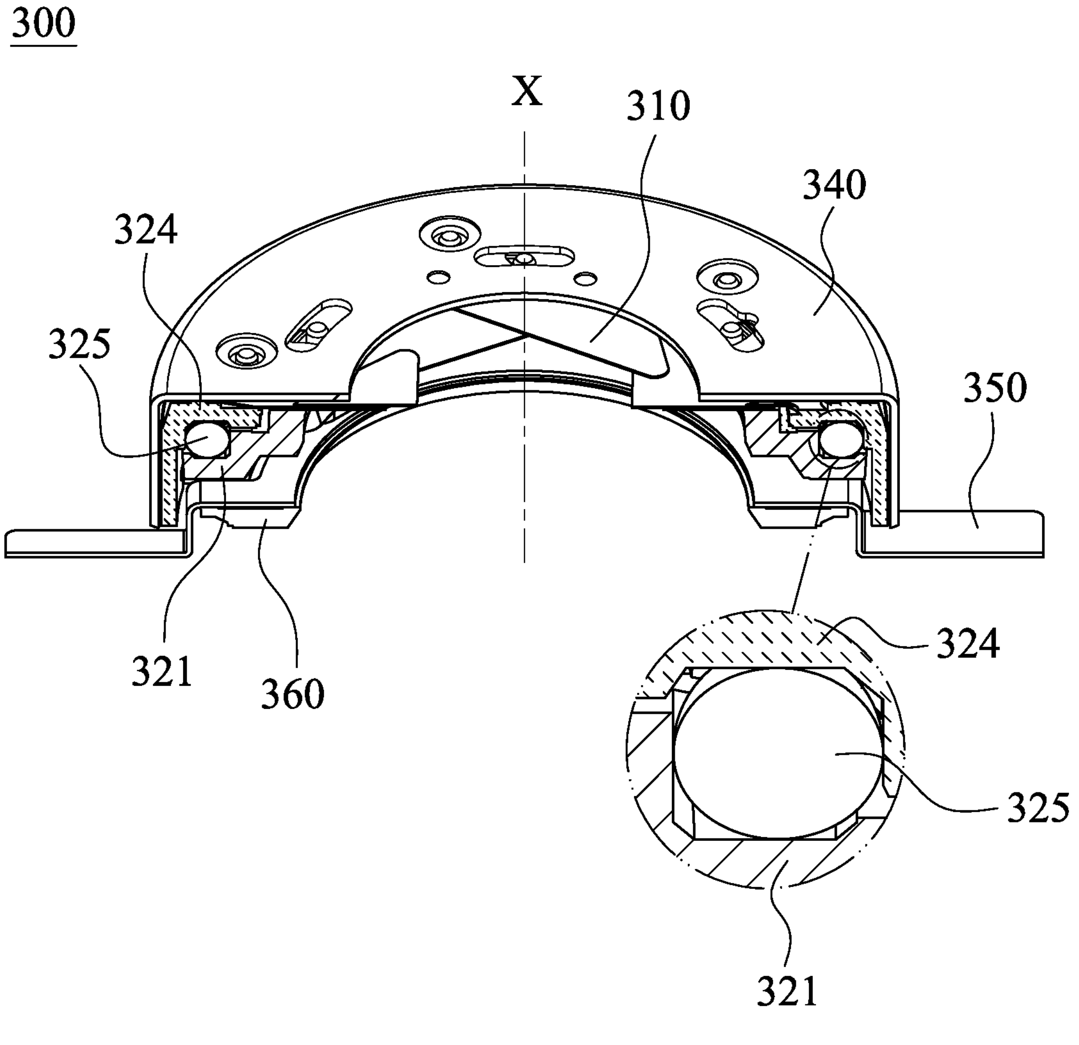
FIG. 3D is a partial cross-sectional view of the dynamic aperture module according to the 3rd embodiment in FIG. 3A.

Please refer to FIG. 3A to FIG. 3D. FIG. 3A is a three-dimensional schematic view of a dynamic aperture module 300 according to the 3rd embodiment of the present disclosure. FIG. 3B is an exploded view of the dynamic aperture module 300 according to the 3rd embodiment in FIG. 3A. FIG. 3C is another exploded view of the dynamic aperture module 300 according to the 3rd embodiment in FIG. 3A. FIG. 3D is a partial cross-sectional view of the dynamic aperture module 300 according to the 3rd embodiment in FIG. 3A. As shown in FIG. 3A to FIG. 3D, the dynamic aperture module 300 includes a blade set 310, a driving portion (its reference numeral is omitted) and a stable hole element 330. The blade set 310 includes a plurality of blades 311. The blades 311 are disposed around an optical axis X to form a light through hole 312 and rotatable for adjusting the light through hole 312. The driving portion includes a rotating element 321, at least one magnet 322, at least one coil 323, a frame element 324 and at least two bearing members 325. In detail, the magnet 322 and the coil 323 drive the rotating element 321 to rotate, and the rotating element 321 and the blades 311 are disposed relatively, so that the blades 311 are rotatable to adjust the dimension of the light through hole 312. In the 3rd embodiment, a number of the blades 311 is 6, a number of the magnets 322 is 2, a number of the coils 323 is 2, a number of the bearing members 325 is 4, but the present disclosure is not limited thereto.

Moreover, the dynamic aperture module 300 can further include an upper cover member 340, a flexible printed circuit board 350 and a base 360, wherein the upper cover member 340 is configured to accommodate the blade set 310, the driving portion and the stable hole element 330. The coils 323 are disposed on the flexible printed circuit board 350, the magnets 322 are disposed on the rotating element 321, and the flexible printed circuit board 350 is disposed on the base 360.

In FIG. 3B and FIG. 3C, the rotating element 321 can rotate relatively to the frame element 324, the rotating element 321 corresponds to the blades 311 and is configured to drive the blades 311 to rotate, so that a dimension of the light through hole 312 is variable. In particular, the magnets 322 and the coils 323 drive the rotating element 321 to rotate relatively to the frame element 324, the rotating element 321 and the blades 311 are disposed relatively, so that the blades 311 are rotatable to adjust the dimension of the light through hole 312.

The coils 323 correspond to the magnets 322, and one of the magnets 322 and the coils 323 is disposed on the rotating element 321. The magnets 322 and the coils 323 are disposed along the direction parallel to the optical axis X.

The frame element 324 is disposed on the rotating element 321 along the direction parallel to the optical axis X. Thus, the rotating element 321 has the sufficient supporting characteristic to support the frame element 324 so as to keep the structural strength thereof and achieve the condition of the mass production. Further, the frame element 324 can include a magnetic element 327, wherein the magnetic element 327 can be insert molded, but the present disclosure is not limited thereto. Furthermore, the magnetic element 327 can interact with the magnets 322 so as to increase the preload force of the frame element 324 to enhance the assembling stability. Or, the magnetic element 327 can interact with the coils 323 so as to maintain the stability of the magnetic field, so that the rotating element 321 can rotate relatively to the frame element 324 stably.

In FIG. 3B to FIG. 3D, the bearing members 325 are disposed between the frame element 324 and the rotating element 321 along the direction parallel to the optical axis X, and it is favorable for the rotating element 321 to rotate. Moreover, each of the bearing members 325 can be a ball element, but the present disclosure is not limited thereto. Further, the bearing members 325 are aligned to the optical axis X, so that the rotating stability of the rotating element 321 can be enhanced.

Further, each of the bearing members 325 can include four contacted points (its reference numeral is omitted), and the contacted points are physically contacted with the frame element 324 or the rotating element 321. The contacted points include an inner contacted point, an outer contacted point, an upper contacted point and a lower contacted point, wherein the inner contacted point is one of the contacted points closest to the optical axis X, the outer contacted point is one of the contacted points farthest away from the optical axis X, the upper contacted point and the lower contacted point are two of the contacted points farthest away from each other on the direction parallel to the optical axis X, respectively.

Figure 3E:
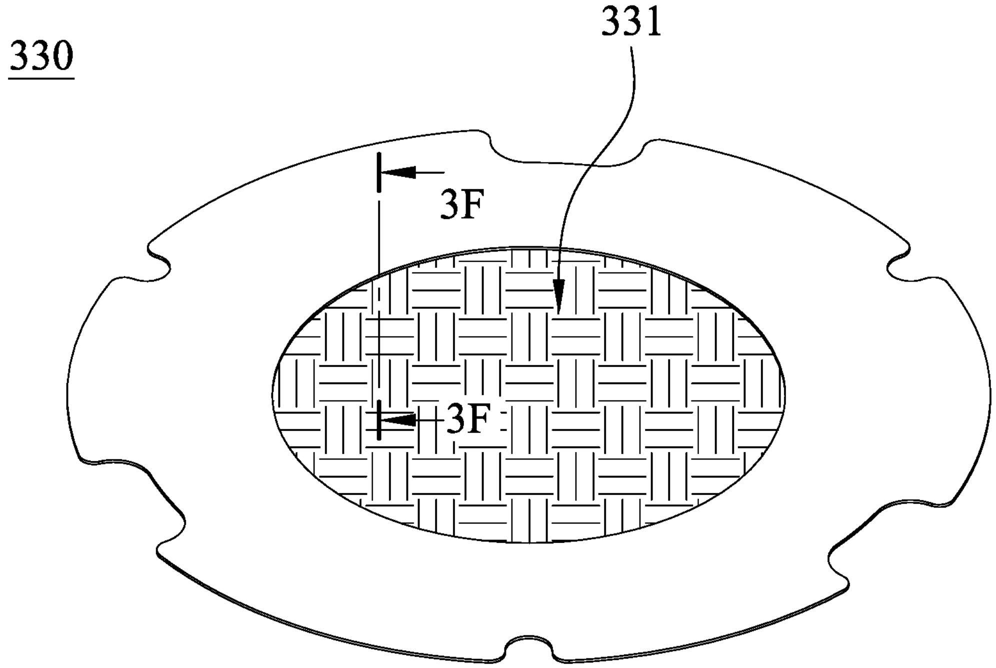
FIG. 3E is a three-dimensional schematic view of the stable hole element according to the 1st example of the 3rd embodiment in FIG. 3A.
Figure 3F:
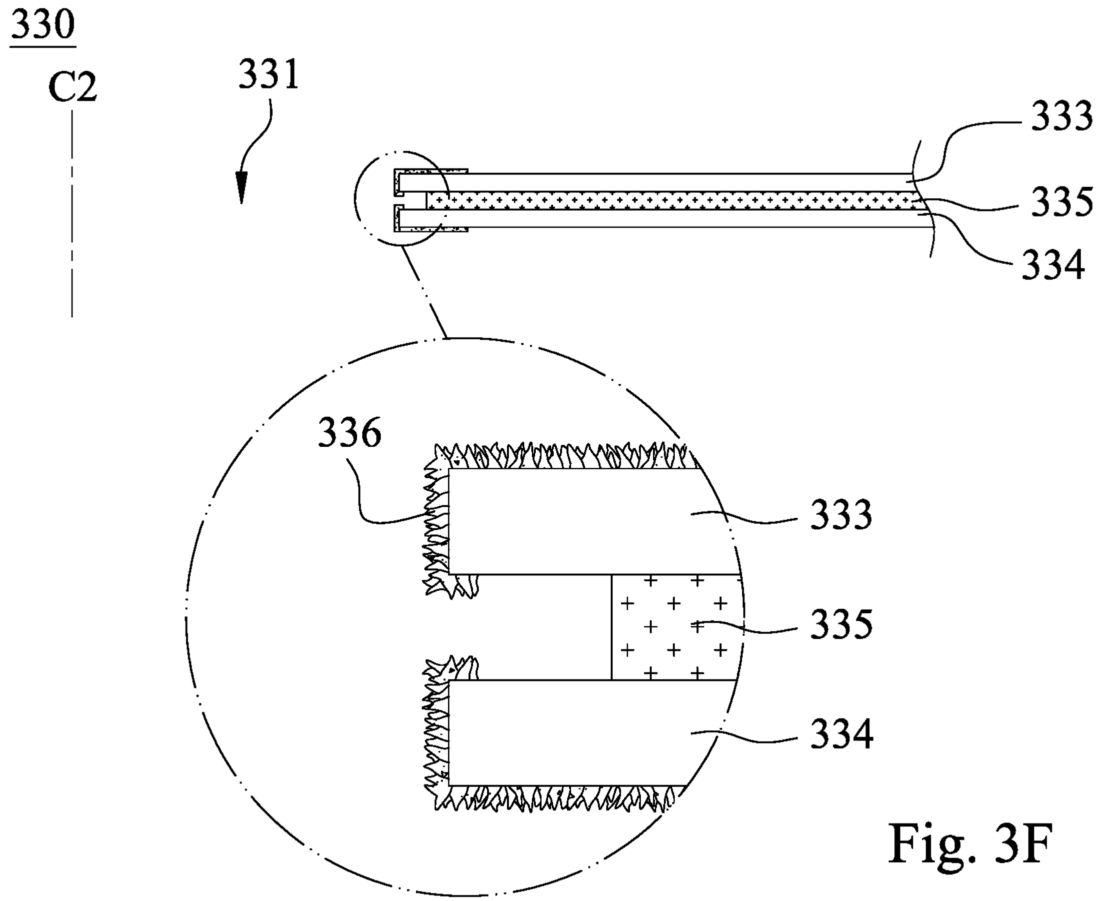
FIG. 3F is a cross-sectional view of the stable hole element along line 3F-3F in FIG. 3E.

Please refer to FIG. 3E and FIG. 3F. FIG. 3E is a three-dimensional schematic view of the stable hole element 330 according to the 1st example of the 3rd embodiment in FIG. 3A. FIG. 3F is a cross-sectional view of the stable hole element 330 along line 3F-3F in FIG. 3E. As shown in FIG. 3B, FIG. 3C, FIG. 3E and FIG. 3F, the stable hole element 330 has a stable hole 331, the stable hole element 330 corresponds to the blade set 310, the stable hole element 330 is adjacent to the blade set 310 and is coaxial with the blade set 310. The stable hole element 330 is disposed along the direction parallel to the optical axis X, and the stable hole element 330 is disposed below the blade set 310.

The stable hole element 330 can include a first surface layer 333, a second surface layer 334, an inner substrate layer 335 and a nanostructure layer 336. The inner substrate layer 335 is disposed between the first surface layer 333 and the second surface layer 334. The nanostructure layer 336 is located at a partial surface of the first surface layer 333 and a partial surface of the second surface layer 334. Further, the first surface layer 333 and the second surface layer 334 of the stable hole element 330 are closer to a center C2 of the light through hole 312 than the inner substrate layer 335 to the center C2 of the light through hole 312. With the interlayer structure, the reflection of the diffused light can be reduced.

Moreover, the nanostructure layer 336 has a plurality of irregular ridge-like protrusions, and an average height of the nanostructure layer 336 can be between 125 nm to 300 nm. With the aforementioned range of the average height of the nanostructure layer, a better anti-reflective effect can be obtained without impacting the imaging quality. Further, the average height of the nanostructure layer 336 can be between 195 nm to 255 nm. Furthermore, the material of the nanostructure layer 336 can include $Al_2O_3$, with the aforementioned range of the average height of the nanostructure layer, a better anti-reflective effect can be obtained without impacting the imaging quality. When the average height of the nanostructure layer 336 approaches 200 nm, the incident light with specific condition can obtain better anti-reflective effect, but the present disclosure is not limited thereto. Moreover, the nanostructure layer 336 has a plurality of irregular protrusions, wherein an average height of the nanostructure layer 336 is between 85 nm to 255 nm.

Figure 3G:
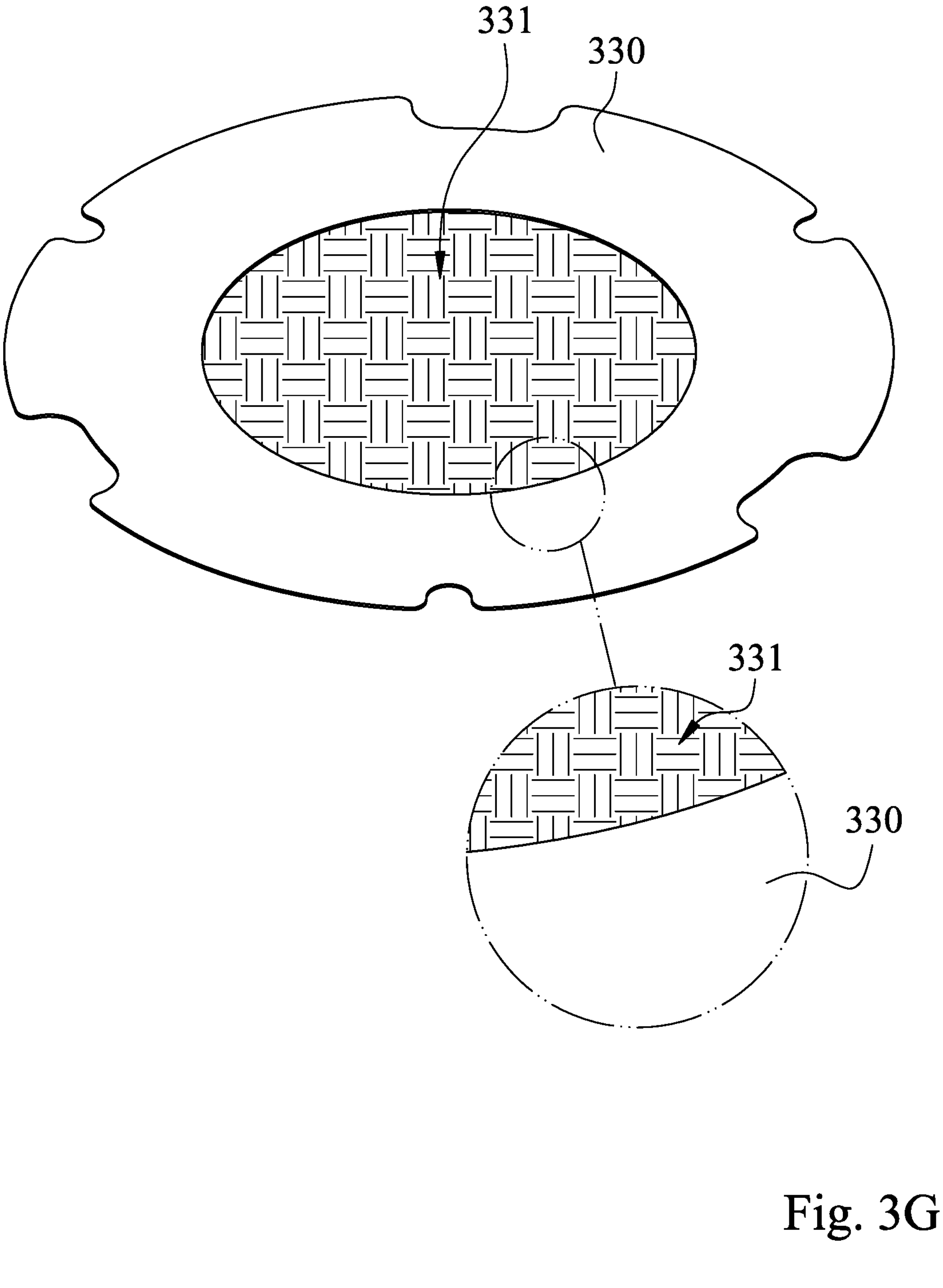
FIG. 3G is a three-dimensional schematic view of the stable hole element according to the 2nd example of the 3rd embodiment in FIG. 3A.

FIG. 3G is a three-dimensional schematic view of the stable hole element 330 according to the 2nd example of the 3rd embodiment in FIG. 3A. In FIG. 3B, FIG. 3C and FIG. 3G, the stable hole element 330 has a stable hole 331, the stable hole element 330 corresponds to the blade set 310, the stable hole element 330 is adjacent to the blade set 310 and is coaxial with the blade set 310.

Figure 3H:
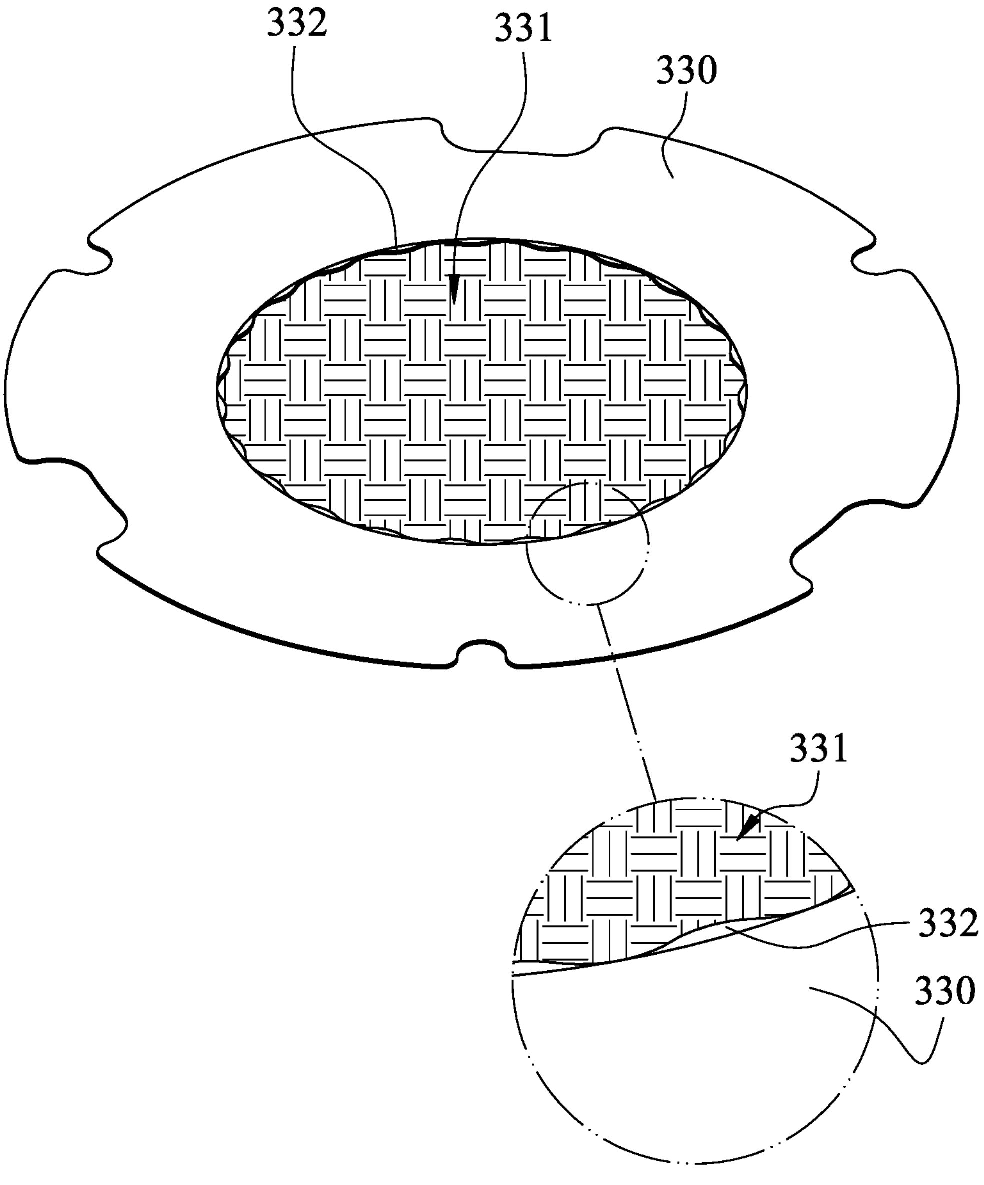
FIG. 3H is a three-dimensional schematic view of the stable hole element according to the 3rd example of the 3rd embodiment in FIG. 3A.

FIG. 3H is a three-dimensional schematic view of the stable hole element 330 according to the 3rd example of the 3rd embodiment in FIG. 3A. In FIG. 3B, FIG. 3C and FIG. 3H, the stable hole element 330 has a stable hole 331, and can include a plurality of light blocking structures 332. The light blocking structures 332 are adjacent to the stable hole 331. In particular, the light blocking structures 332 can block a stray light.

It should be mentioned that, in FIG. 3B, FIG. 3C, FIG. 3E, FIG. 3G and FIG. 3H, the horizontal-lined mesh and the interwoven mesh are configured to indicate the light through hole 312 and the stable hole 331, respectively.

4th Embodiment

Figure 4A:
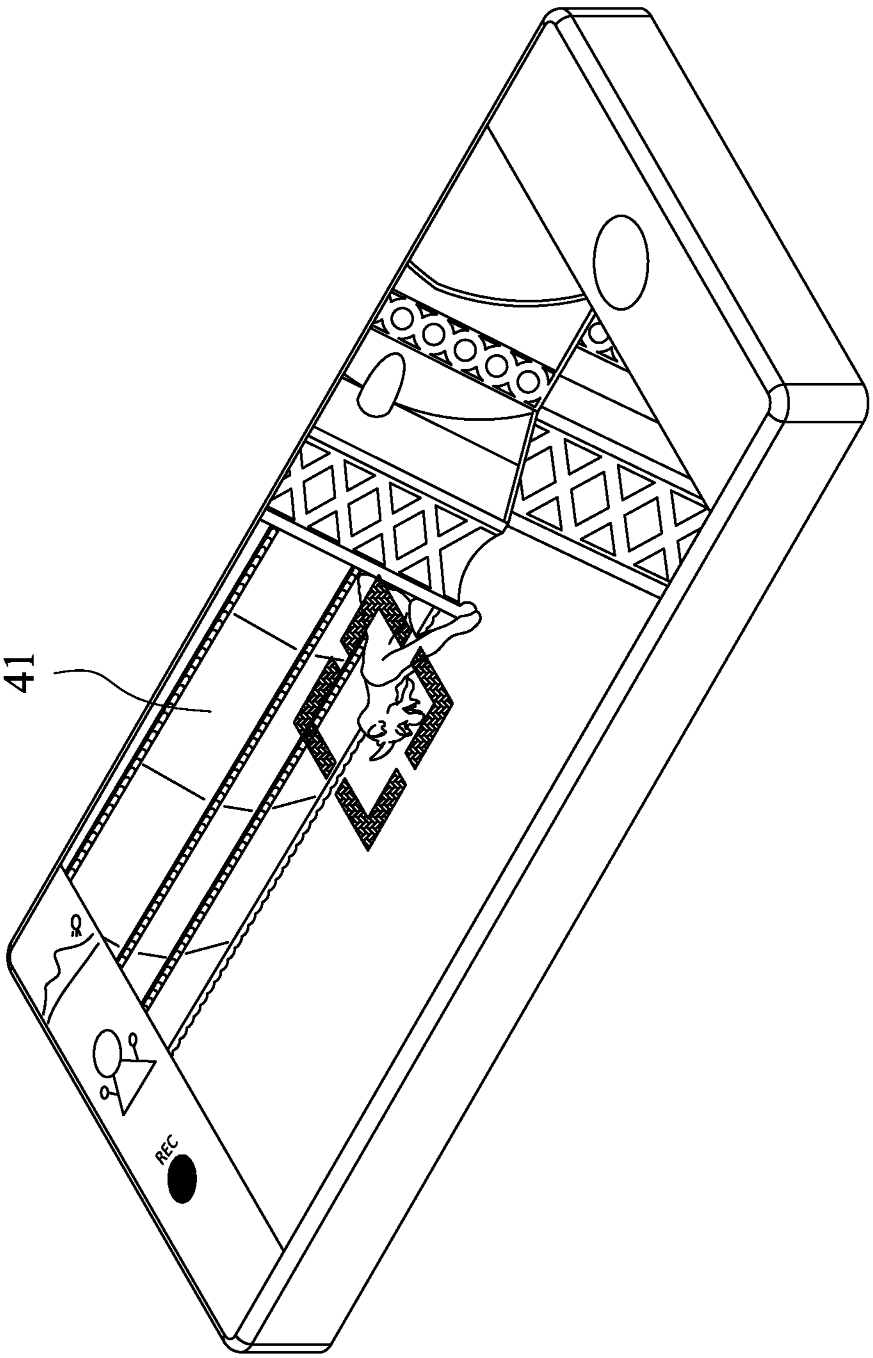
FIG. 4A is a schematic view of an electronic device according to the 4th embodiment of the present disclosure.
Figure 4B:
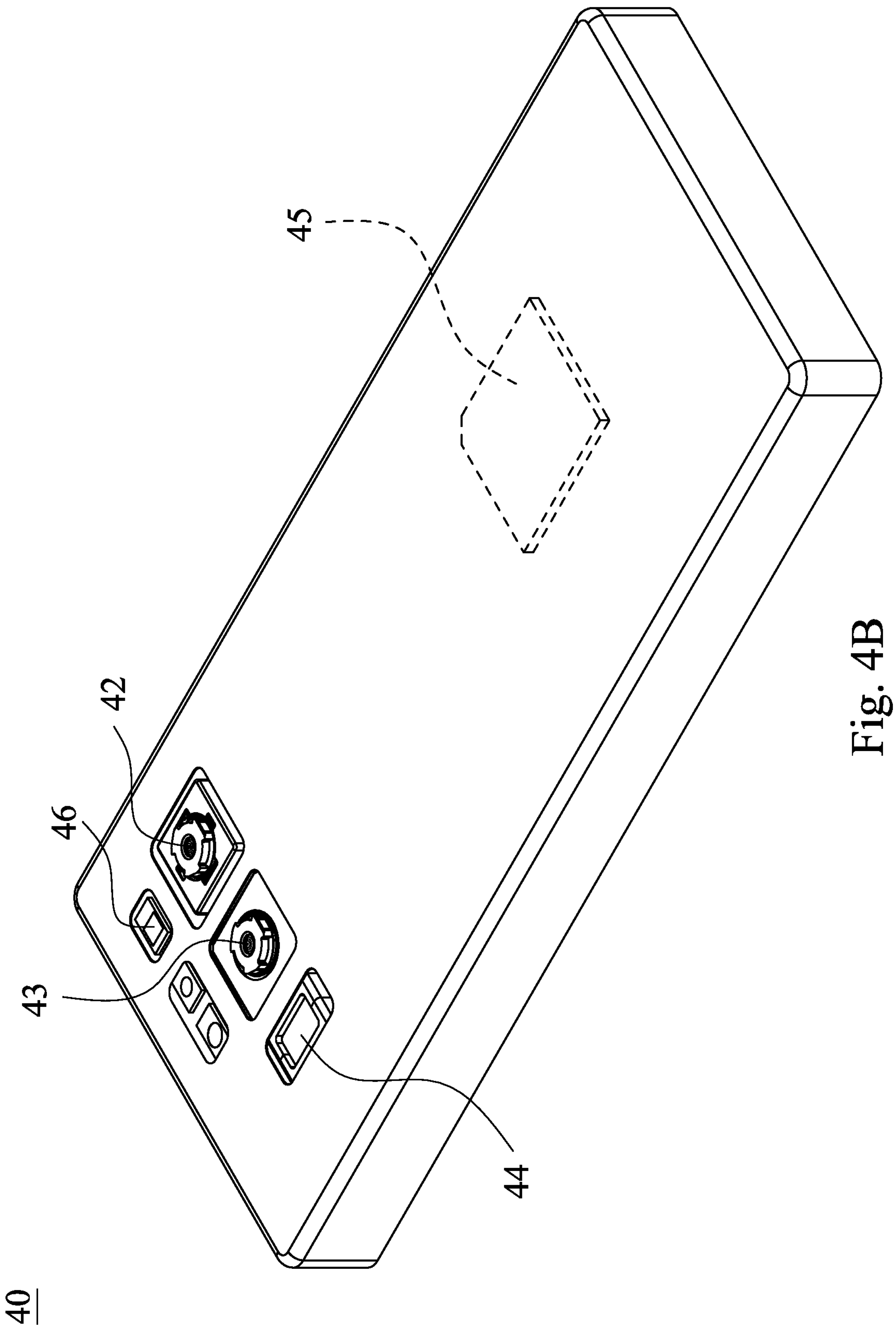
FIG. 4B is another schematic view of the electronic device according to the 4th embodiment in FIG. 4A.

Please refer to FIG. 4A and FIG. 4B. FIG. 4A is a schematic view of an electronic device 40 according to the 4th embodiment of the present disclosure. FIG. 4B is another schematic view of the electronic device 40 according to the 4th embodiment in FIG. 4A. In FIG. 4A and FIG. 4B, the electronic device 40 is a smart phone, and includes an imaging lens assembly module and a user interface 41. Moreover, the electronic device 40 includes a dynamic aperture module (not shown) and an imaging lens assembly (not shown), wherein the dynamic aperture module and the imaging lens assembly are arranged in order from an object side to an image side along the optical axis, and a light enters the imaging lens assembly via the light through hole. Further, the imaging lens assembly module can be an ultra-wide angle imaging lens assembly module 42, a high resolution imaging lens assembly module 43 and a telephoto imaging lens assembly module 44, and the user interface 41 is a touch screen, but the present disclosure is not limited thereto. In particular, the dynamic aperture module can be one of the dynamic aperture modules according to the aforementioned 1st embodiment, the 2nd embodiment and the 3rd embodiment, but the present disclosure is not limited thereto.

Users enter a shooting mode via the user interface 41, wherein the user interface 41 is configured to display the scene, and the shooting angle can be manually adjusted to switch the ultra-wide angle imaging lens assembly module 42, the high resolution imaging lens assembly module 43 and the telephoto imaging lens assembly module 44. At this moment, the imaging light is gathered on the image sensor (not shown) via the imaging lens assembly module, and an electronic signal about an image is output to an image signal processor (ISP) 45.

In FIG. 4B, to meet a specification of the electronic device 40, the electronic device 40 can further include an optical anti-shake mechanism (not shown). Furthermore, the electronic device 40 can further include at least one focusing assisting module (its reference numeral is omitted) and at least one sensing element (not shown). The focusing assisting module can be a flash module 46 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the imaging lens assembly module of the electronic device 40 is equipped with an auto-focusing mechanism and the optical anti-shake mechanism can be enhanced to achieve the superior image quality. Furthermore, the electronic device 40 according to the present disclosure can have a capturing function with multiple modes, such as taking optimized selfies, high dynamic range (HDR) under a low light condition, 4K resolution recording and so on. Furthermore, the users can visually see a captured image of the camera through the user interface 41 and manually operate the view finding range on the user interface 41 to achieve the autofocus function of what you see is what you get.

Moreover, the imaging lens assembly module, the optical anti-shake mechanism, the sensing element and the focusing assisting module can be disposed on a flexible printed circuit board (FPC) (not shown) and electrically connected to the associated components, such as the image signal processor 45, via a connector (not shown) to perform a capturing process. Since the current electronic devices, such as smart phones, have a tendency of being compact, the way of firstly disposing the imaging lens assembly module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the imaging lens assembly module can also be controlled more flexibly via the touch screen of the electronic device. According to the 4th embodiment, the electronic device 40 can include a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 45, via corresponding connectors to perform the capturing process. In other embodiments (not shown herein), the sensing elements and the focusing assisting modules can also be disposed on the main board of the electronic device or carrier boards of other types according to requirements of the mechanical design and the circuit layout.

Furthermore, the electronic device 40 can further include, but not be limited to, a display, a control unit, a storage unit, a random access memory (RAM), a read-only memory (ROM), or the combination thereof.

Figure 4C:
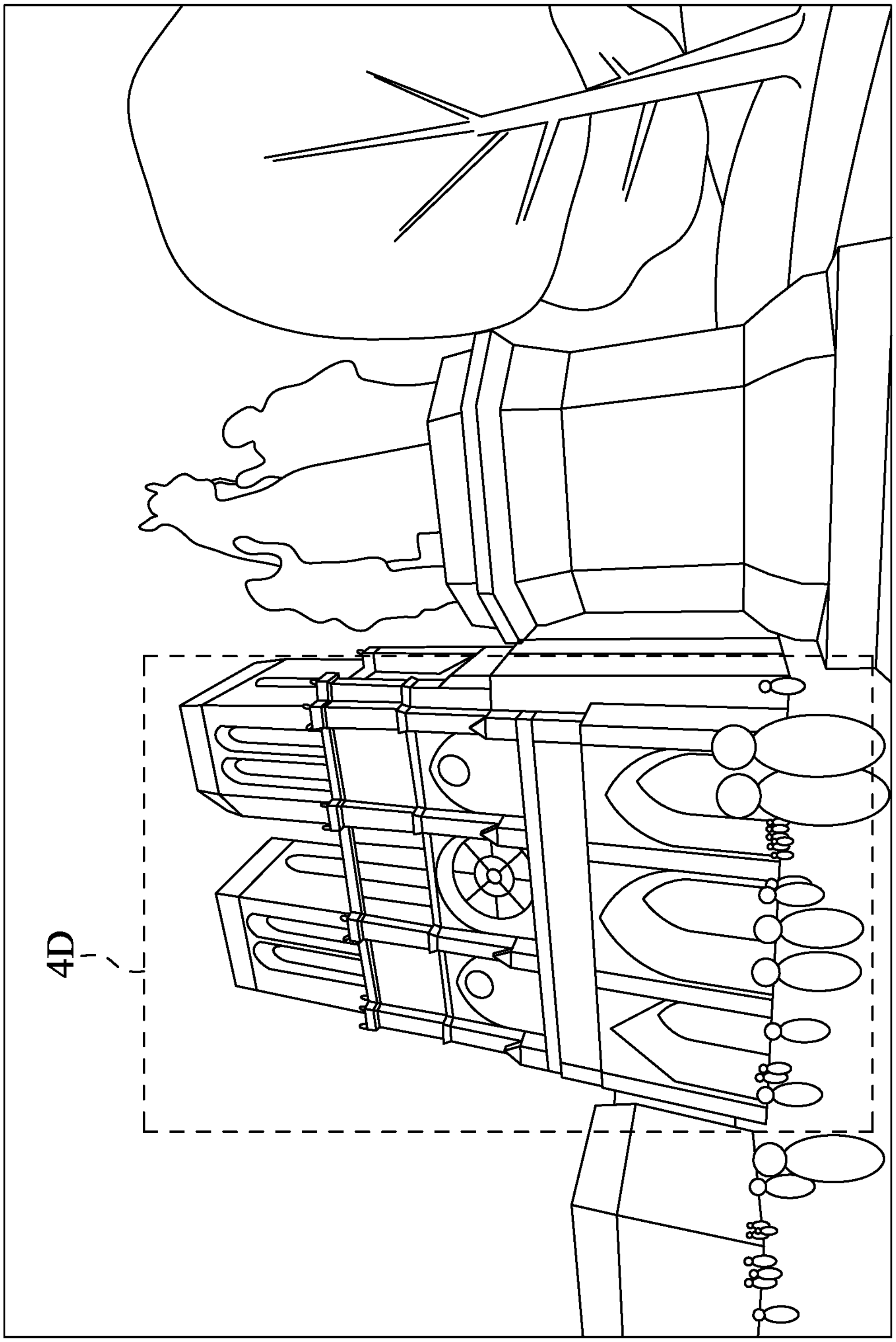
FIG. 4C is a schematic view of an image captured via the electronic device according to the 4th embodiment in FIG. 4A.

FIG. 4C is a schematic view of an image captured via the electronic device 40 according to the 4th embodiment in FIG. 4A. In FIG. 4C, the larger range of the image can be captured via the ultra-wide angle imaging lens assembly module 42, and the ultra-wide angle imaging lens assembly module 42 has the function of accommodating wider range of the scene.

Figure 4D:
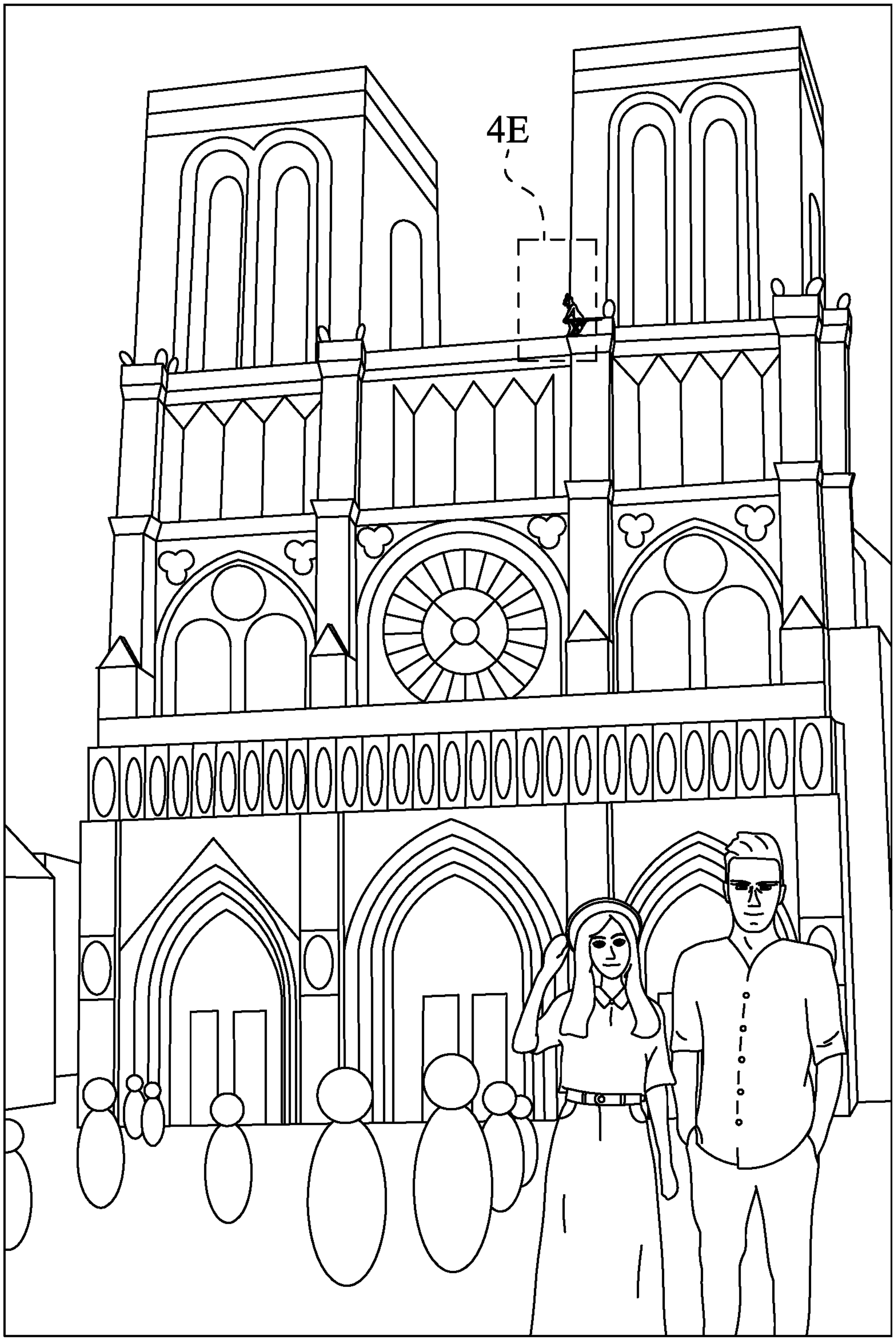
FIG. 4D is another schematic view of an image captured via the electronic device according to the 4th embodiment in FIG. 4A.

FIG. 4D is another schematic view of an image captured via the electronic device 40 according to the 4th embodiment in FIG. 4A. In FIG. 4D, the image of the certain range with the high resolution can be captured via the high resolution imaging lens assembly module 43, and the high resolution imaging lens assembly module 43 has the function of the high resolution and the low deformation.

Figure 4E:
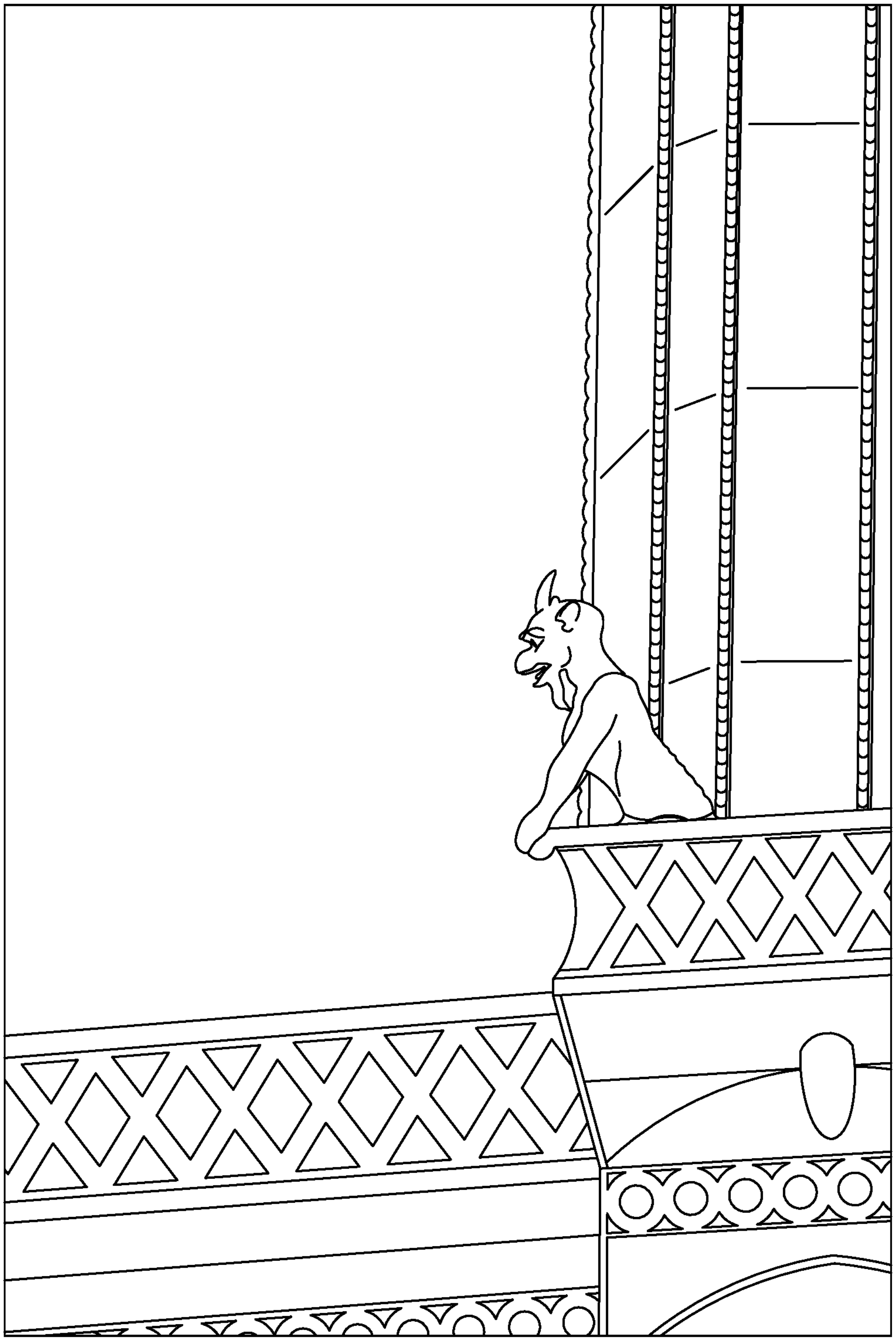
FIG. 4E is still another schematic view of an image captured via the electronic device according to the 4th embodiment in FIG. 4A.

FIG. 4E is still another schematic view of an image captured via the electronic device 40 according to the 4th embodiment in FIG. 4A. In FIG. 4E, the telephoto imaging lens assembly module 44 has the enlarging function of the high magnification, and the distant image can be captured and enlarged with high magnification via the telephoto imaging lens assembly module 44.

As shown in FIG. 4C to FIG. 4E, the zooming function can be obtained via the electronic device 40, when the scene is captured via the imaging lens assembly module with different focal lengths cooperated with the function of image processing.

5th Embodiment

Figure 5:
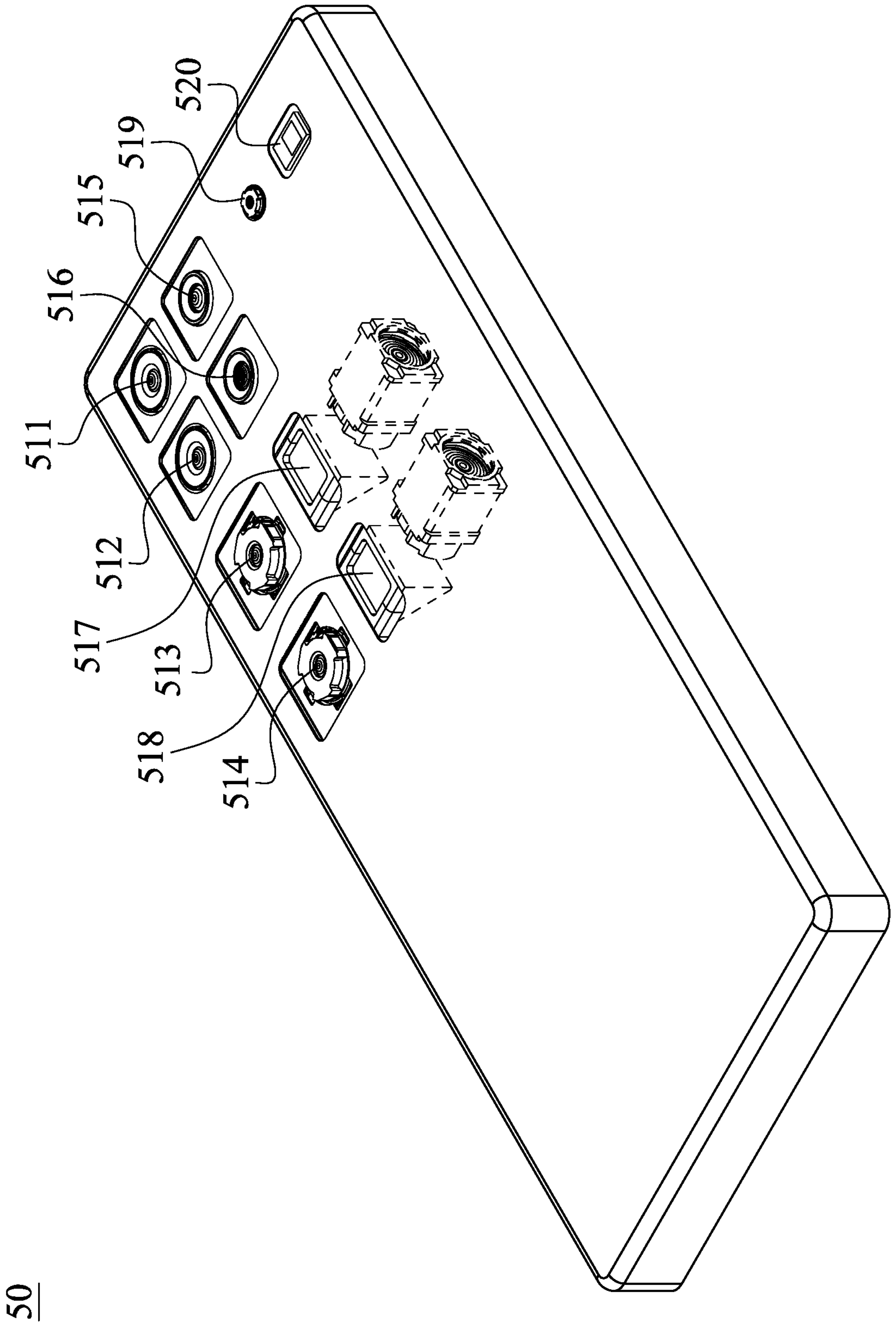
FIG. 5 is a schematic view of an electronic device according to the 5th embodiment of the present disclosure.

FIG. 5 is a schematic view of an electronic device 50 according to the 5th embodiment of the present disclosure. In FIG. 5, the electronic device 50 is a smart phone, and includes an imaging lens assembly module, and the imaging lens assembly module includes a dynamic aperture module (not shown) and an imaging lens assembly (not shown), wherein the dynamic aperture module and the imaging lens assembly are arranged in order from an object side to an image side along the optical axis, and a light enters the imaging lens assembly via the light through hole. Moreover, the imaging lens assembly module can be one of ultra-wide angle imaging lens assembly modules 511, 512, wide angle imaging lens assembly modules 513, 514, telephoto imaging lens assembly modules 515, 516, 517, 518 and a Time-Of-Flight (TOF) module 519. The TOF module 519 can be another type of the imaging lens assembly module, and the disposition is not limited thereto. In particular, the dynamic aperture module can be one of the dynamic aperture modules according to the aforementioned 1st embodiment to the 3rd embodiment, but the present disclosure is not limited thereto.

Further, the telephoto imaging lens assembly modules 517, 518 are configured to fold the light, but the present disclosure is not limited thereto.

To meet a specification of the electronic device 50, the electronic device 50 can further include an optical anti-shake mechanism (not shown). Furthermore, the electronic device 50 can further include at least one focusing assisting module (not shown) and at least one sensing element (not shown). The focusing assisting module can be a flash module 520 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the imaging lens assembly module of the electronic device 50 is equipped with an auto-focusing mechanism and the optical anti-shake mechanism can be enhanced to achieve the superior image quality. Furthermore, the electronic device 50 according to the present disclosure can have a capturing function with multiple modes, such as taking optimized selfies, High Dynamic Range (HDR) under a low light condition, 4K resolution recording and so on.

Further, all of other structures and dispositions according to the 5th embodiment are the same as the structures and the dispositions according to the 4th embodiment, and will not be described again herein.

The foregoing description, for purpose of explanation, has been described with reference to specific embodiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A dynamic aperture module, comprising:

a blade set, comprising:

a plurality of blades, wherein the blades are disposed around an optical axis to form a light through hole and rotatable for adjusting the light through hole; and a driving portion, comprising:

a rotating element, wherein the rotating element corresponds to the blades and is configured to drive the blades to rotate, so that a dimension of the light through hole is variable;

at least one magnet comprising four polarities, wherein the polarities of the at least one magnet are relatively distributed along a direction surrounding the optical axis and a direction parallel to the optical axis, respectively;

at least one coil, wherein the at least one coil corresponds to the at least one magnet, and one of the at least one magnet and the at least one coil is disposed on the rotating element;

a frame element disposed on the rotating element along the direction parallel to the optical axis; and at least two bearing members disposed between the frame element and the rotating element along the direction parallel to the optical axis, wherein each of the at least two bearing members comprises:

four contacted points physically contacted with the frame element or the rotating element. and the contacted points comprising:

an inner contacted point being one of the contacted points closest to the optical axis;

an outer contacted point being one of the contacted points farthest away from the optical axis;

an upper contacted point being one of two of the contacted points farthest away on the direction parallel to the optical axis; and a lower contacted point being the other one of the two of the contacted points farthest away on the direction parallel to the optical axis;

wherein the at least one magnet and the at least one coil are disposed along the direction parallel to the optical axis.

2. The dynamic aperture module of claim 1, wherein the frame element comprises:

a magnetic element, wherein the magnetic element interacts with the at least one magnet.

3. The dynamic aperture module of claim 1, wherein the frame element comprises:

a magnetic element, wherein the magnetic element interacts with the at least one coil.

4. The dynamic aperture module of claim 1, wherein a number of the at least two bearing members is not more than five.

5. The dynamic aperture module of claim 4, wherein along a direction vertical to the optical axis, a distance between the inner contacted point and the outer contacted point is Dt, a distance between the inner contacted point and the lower contacted point is Di, and the following condition is satisfied:

$$0.3 \leq Di/Dt \leq 0.7.$$

6. The dynamic aperture module of claim 1, wherein each of the blades comprises:

a first surface layer;

a second surface layer; and an inner substrate layer disposed between the first surface layer and the second surface layer.

7. The dynamic aperture module of claim 6, wherein the blades surround the optical axis to form the light through hole, and the first surface layer and the second surface layer of each of the blades are closer to a center of the light through hole than the inner substrate layer to the center of the light through hole.

8. The dynamic aperture module of claim 7, wherein each of the blades further comprises:

a nanostructure layer having a plurality of irregular protrusions, wherein an average height of the nanostructure layer is between 85 nm to 255 nm.

9. The dynamic aperture module of claim 1, further comprising:

a stable hole element having a stable hole, wherein the stable hole element corresponds to the blade set, the stable hole element is adjacent to the blade set and is coaxial with the blade set.

10. The dynamic aperture module of claim 9, wherein the stable hole element comprises:

a plurality of light blocking structures adjacent to the stable hole.

11. The dynamic aperture module of claim 9, wherein the stable hole element comprises:

a nanostructure layer having a plurality of irregular ridge-like protrusions, wherein an average height of the nanostructure layer is between 125 nm to 300 nm.

12. The dynamic aperture module of claim 11, wherein the average height of the nanostructure layer is between 195 nm to 255 nm.

13. The dynamic aperture module of claim 9, wherein the stable hole element comprises:

a nanostructure layer having a plurality of irregular protrusions, wherein an average height of the nanostructure layer is between 85 nm to 255 nm.

14. An imaging lens assembly module, comprising:

the dynamic aperture module of claim 1; and an imaging lens assembly, wherein the dynamic aperture module and the imaging lens assembly are arranged in order from an object side to an image side along the optical axis, and a light enters the imaging lens assembly via the light through hole.

15. An electronic device, comprising:

the imaging lens assembly module of claim 14.

16. A dynamic aperture module, comprising:

a blade set, comprising:

a plurality of blades, wherein the blades are disposed around an optical axis to form a light through hole and rotatable for adjusting the light through hole; and a driving portion, comprising:

a frame element;

a rotating element, wherein the rotating element rotates relatively to the frame element, corresponds to the blades, and is configured to drive the blades to rotate relatively to the frame element, so that a dimension of the light through hole is variable;

at least one magnet;

at least one coil, wherein the at least one coil corresponds to the at least one magnet, and one of the at least one magnet and the at least one coil is disposed on the rotating element; and at least two bearing members disposed between the frame element and the rotating element along a direction parallel to the optical axis, wherein each of the at least two bearing members comprises:

three contacted points physically contacted with the frame element or the rotating element, and the contacted points comprising:

an inner contacted point being one of the contacted points closest to the optical axis;

an outer contacted point being one of the contacted points farthest away from the optical axis;

an upper contacted point being one of two of the contacted points farthest away on the direction parallel to the optical axis; and a lower contacted point being the other one of the two of the contacted points farthest away on the direction parallel to the optical axis;

wherein one of the contacted points is simultaneously one of the inner contacted point and the outer contacted point and one of the upper contacted point and the lower contacted point.

17. The dynamic aperture module of claim 16, wherein a number of the at least two bearing members is not more than five.

18. The dynamic aperture module of claim 17, wherein along a direction vertical to the optical axis, a distance between the inner contacted point and the outer contacted point is Dt, a distance between a remaining one of the contacted points and the inner contacted point is Di', and the following condition is satisfied:

$$0.3 \leq Di'/Dt \leq 0.7.$$

19. The dynamic aperture module of claim 16, further comprising:

a stable hole element having a stable hole, wherein the stable hole element corresponds to the blade set, the stable hole element is adjacent to the blade set and is coaxial with the blade set.

20. The dynamic aperture module of claim 19, further comprising:

a light blocking element, wherein the light blocking element and the stable hole element are disposed relatively to the blade set, respectively.

21. The dynamic aperture module of claim 19, wherein the stable hole element comprises:

a plurality of light blocking structures adjacent to the stable hole.

22. An imaging lens assembly module, comprising:

the dynamic aperture module of claim 16; and an imaging lens assembly, wherein the dynamic aperture module and the imaging lens assembly are arranged in order from an object side to an image side along the optical axis, and a light enters the imaging lens assembly via the light through hole.

23. An electronic device, comprising:

the imaging lens assembly module of claim 22.

24. A dynamic aperture module, comprising:

a blade set, comprising:

a plurality of blades, wherein the blades are disposed around an optical axis to form a light through hole and rotatable for adjusting the light through hole, and each of the blades comprises:

a first surface layer;

a second surface layer; and an inner substrate layer disposed between the first surface layer and the second surface layer;

a driving portion, comprising:

a rotating element, wherein the rotating element corresponds to the blades and is configured to drive the blades to rotate, so that a dimension of the light through hole is variable;

at least one magnet; and at least one coil, wherein the at least one coil corresponds to the at least one magnet, and one of the at least one magnet and the at least one coil is disposed on the rotating element; and a stable hole element having a stable hole, wherein the stable hole element corresponds to the blade set, the stable hole element is adjacent to the blade set and is coaxial with the blade set;

wherein the blades surround the optical axis to form the light through hole, and the first surface layer and the second surface layer of each of the blades are closer to a center of the light through hole than the inner substrate layer to the center of the light through hole.

25. The dynamic aperture module of claim 24, further comprising:

a light blocking element, wherein the light blocking element and the stable hole element are disposed relatively to the blade set, respectively.

26. The dynamic aperture module of claim 24, wherein the stable hole element comprises:

a plurality of light blocking structures adjacent to the stable hole.

27. The dynamic aperture module of claim 24, wherein the stable hole element comprises:

a nanostructure layer having a plurality of irregular ridge-like protrusions, wherein an average height of the nanostructure layer is between 125 nm to 300 nm.

28. The dynamic aperture module of claim 27, wherein the average height of the nanostructure layer is between 195 nm to 255 nm.

29. The dynamic aperture module of claim 24, wherein the stable hole element comprises:

a first surface layer;

a second surface layer; and an inner substrate layer disposed between the first surface layer and the second surface layer.

30. The dynamic aperture module of claim 29, wherein the first surface layer and the second surface layer of the stable hole element are closer to the center of the light through hole than the inner substrate layer to the center of the light through hole.

31. The dynamic aperture module of claim 30, wherein the stable hole element comprises:

a nanostructure layer having a plurality of irregular protrusions, wherein an average height of the nanostructure layer is between 85 nm to 255 nm.

32. An imaging lens assembly module, comprising:

the dynamic aperture module of claim 24; and an imaging lens assembly, wherein the dynamic aperture module and the imaging lens assembly are arranged in order from an object side to an image side along the optical axis, and a light entering the imaging lens assembly via the light through hole.

33. An electronic device, comprising:

the imaging lens assembly module of claim 32.

* * * * *